United States Patent
Holmes et al.

(10) Patent No.: US 12,106,488 B2
(45) Date of Patent: Oct. 1, 2024

(54) CAMERA FRAME EXTRAPOLATION FOR VIDEO PASS-THROUGH

(71) Applicant: QUALCOMM Incorporated, San Diego, CA (US)

(72) Inventors: Samuel Benjamin Holmes, Sterling, MA (US); Jonathan Wicks, Superior, CO (US); Arjun Chopra, San Diego, CA (US); Martin Renschler, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 17/739,820

(22) Filed: May 9, 2022

(65) Prior Publication Data
US 2023/0360227 A1 Nov. 9, 2023

(51) Int. Cl.
*G06T 7/20* (2017.01)
*G06T 19/00* (2011.01)

(52) U.S. Cl.
CPC .............. *G06T 7/20* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 6,025,879 A | * | 2/2000 | Yoneyama | H04N 19/503 375/E7.263 |
| 2006/0193388 A1 | * | 8/2006 | Woods | H04N 19/615 375/E7.072 |
| 2007/0160143 A1 | * | 7/2007 | Lee | H04N 19/52 375/E7.125 |
| 2015/0212576 A1 | * | 7/2015 | Ambrus | G06F 3/0482 345/156 |

(Continued)

FOREIGN PATENT DOCUMENTS

| | | |
|---|---|---|
| EP | 3382651 A1 | 10/2018 |
| WO | 2020219982 A1 | 10/2020 |

OTHER PUBLICATIONS

Hui-Ping D., et al., "Adaptive Interpolation/Extrapolation and Motion Vector Processing Method for Frame Rate Up Conversion", 2009 Fifth International Conference on Image and Graphics, IEEE, Piscataway, NJ, USA, Sep. 20, 2009, pp. 18-22, XP031652631, ISBN: 978-1-4244-5237-8, Paragraph [0002]-Paragraph [0005].

(Continued)

*Primary Examiner* — David H Chu
(74) *Attorney, Agent, or Firm* — Polsinelli

(57) ABSTRACT

Systems and techniques are provided for synchronizing a frame rate of pass-through content from a camera and a display refresh rate. An example method can include obtaining first and second frames captured by an image capture device (which may be part of a device, such as an extended reality (XR) device). A display refresh rate of a display is greater than a camera frame rate of the image capture device.

(Continued)

The method may determine motion between the first frame and the second frame. The method can include predicting, based on the second frame and the determined motion, a third frame corresponding to a time after the second frame. The method can include displaying content (e.g., mixed reality content) including the predicted third frame and virtual content rendered for the XR device.

29 Claims, 8 Drawing Sheets

(56) References Cited

U.S. PATENT DOCUMENTS

| | | | |
|---|---|---|---|
| 2017/0285732 A1* | 10/2017 | Daly | G06F 3/015 |
| 2018/0307042 A1* | 10/2018 | Riguer | G09G 3/002 |
| 2019/0043448 A1* | 2/2019 | Thakur | G09G 5/003 |
| 2020/0168001 A1 | 5/2020 | Yang et al. | |
| 2020/0304799 A1* | 9/2020 | Streater | H04N 19/137 |
| 2021/0056719 A1* | 2/2021 | Li | G06T 3/18 |
| 2021/0225064 A1* | 7/2021 | Ding | G06T 15/20 |
| 2021/0258555 A1* | 8/2021 | Leiby | H04N 13/344 |
| 2021/0358222 A1* | 11/2021 | Pejsa | G06F 3/0346 |
| 2023/0030247 A1* | 2/2023 | Sevostianov | H04N 13/117 |

OTHER PUBLICATIONS

International Search Report and Written Opinion—PCT/US2023/066019—ISA/EPO—Jul. 14, 2023.

* cited by examiner

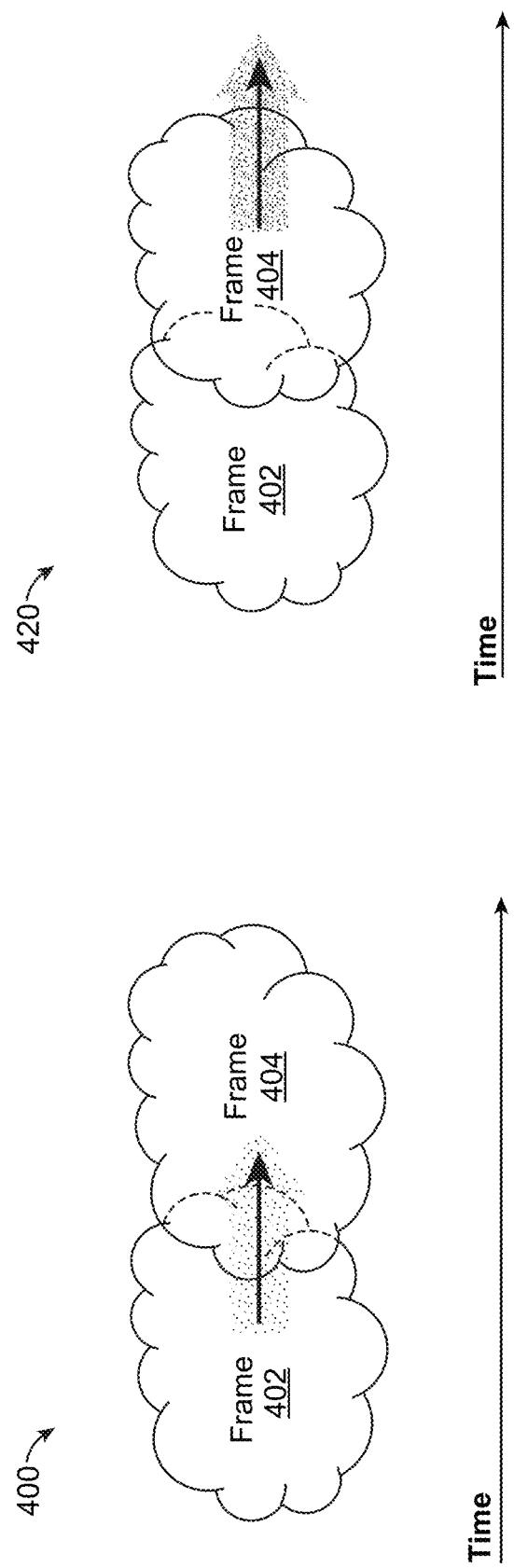

600

---

OBTAIN A FIRST FRAME AND A SECOND FRAME CAPTURED BY AN IMAGE CAPTURE DEVICE, THE FIRST FRAME BEING CAPTURED BEFORE THE SECOND FRAME, WHEREIN A DISPLAY REFRESH RATE OF A DISPLAY IS GREATER THAN A CAMERA FRAME RATE OF THE IMAGE CAPTURE DEVICE
602

DETERMINE MOTION BETWEEN THE FIRST FRAME AND THE SECOND FRAME
604

PREDICT, BASED ON THE SECOND FRAME AND THE MOTION BETWEEN THE FIRST FRAME AND THE SECOND FRAME, A THIRD FRAME CORRESPONDING TO A TIME AFTER THE SECOND FRAME
606

DISPLAY, AT THE DISPLAY, CONTENT COMPRISING THE PREDICTED THIRD FRAME AND VIRTUAL CONTENT RENDERED FOR THE APPARATUS
608

FIG. 6

CAMERA FRAME EXTRAPOLATION FOR VIDEO PASS-THROUGH

TECHNICAL FIELD

The present disclosure generally relates to video content for extended reality video pass-through. For example, aspects of the present disclosure relate to techniques and systems for camera frame extrapolation for extended reality video pass-through.

BACKGROUND

Extended reality (e.g., augmented reality, virtual reality, mixed reality, video passthrough, etc.) devices, such as smart glasses and head-mounted displays (HMDs), generally implement cameras and sensors to track the position of the extended reality (XR) device and other objects within the physical environment. The XR devices can use such tracking information to provide a user of the XR device a realistic XR experience. For example, an XR device can allow a user to experience or interact with immersive virtual environments or content. To provide realistic XR experiences, XR technologies can integrate virtual content with the physical world or a video feed depicting a scene in the physical world. In some cases, XR technologies can match the relative pose and movement of objects and devices in the physical world. For example, an XR device can use tracking information to calculate the relative pose of devices, objects, and/or features of the real-world environment in order to match the relative position and movement of the devices, objects, and/or the real-world environment. In some cases, the XR device can use the pose and movement of one or more devices, objects, and/or the real-world environment to render content relative to the real-world environment in a convincing manner. The relative pose information can be used to match virtual content with the user's perceived motion and the spatio-temporal state of the devices, objects, and real-world environment.

BRIEF SUMMARY

In some examples, systems, apparatuses, processes (also referred to as methods), and computer-readable media (collectively referred to as "systems and techniques") are described for synchronizing a frame rate of pass-through content from a camera and a display refresh rate. According to at least one illustrative example, a method is provided for synchronizing a frame rate of pass-through content from a camera and a display refresh rate. In some examples, the method can include: obtaining a first frame and a second frame captured by an image capture device of an electronic device, the first frame being captured before the second frame, wherein a display refresh rate of a display is greater than a camera frame rate of the image capture device; determining motion between the first frame and the second frame; predicting, based on the second frame and the motion between the first frame and the second frame, a third frame corresponding to a time after the second frame; and displaying, at the display of the electronic device, content comprising the predicted third frame and virtual content rendered for the electronic device.

In another illustrative example, an apparatus is provided for synchronizing a frame rate of pass-through content from a camera and a display refresh rate. In some examples, the apparatus can include a memory and one or more processors coupled to the memory, the one or more processors configured to: obtain a first frame and a second frame captured by an image capture device, the first frame being captured before the second frame, wherein a display refresh rate of a display is greater than a camera frame rate of the image capture device; determine motion between the first frame and the second frame; predict, based on the second frame and the motion between the first frame and the second frame, a third frame corresponding to a time after the second frame; and display, at the display, content comprising the predicted third frame and virtual content rendered for the apparatus.

In another illustrative example, a non-transitory computer-readable medium is provided for synchronizing a frame rate of pass-through content from a camera and a display refresh rate. In some examples, the non-transitory computer-readable medium can include instructions stored thereon which, when executed by one or more processors, cause the one or more processors to: obtain a first frame and a second frame captured by an image capture device of an electronic device, the first frame being captured before the second frame, wherein a display refresh rate of a display is greater than a camera frame rate of the image capture device; determine motion between the first frame and the second frame; predict, based on the second frame and the motion between the first frame and the second frame, a third frame corresponding to a time after the second frame; and display, at the display of the electronic device, content comprising the predicted third frame and virtual content rendered for the electronic device.

In another illustrative example, another apparatus is provided for synchronizing a frame rate of pass-through content from a camera and a display refresh rate. In some examples, the apparatus can include means for obtaining a first frame and a second frame captured by an image capture device, the first frame being captured before the second frame, wherein a display refresh rate of a means for displaying is greater than a camera frame rate of the image capture device; means for determining motion between the first frame and the second frame; and means for predicting, based on the second frame and the motion between the first frame and the second frame, a third frame corresponding to a time after the second frame; wherein the means for displaying is configured to display content comprising the predicted third frame and virtual content rendered for the apparatus.

In some aspects, an apparatus can be, or can be part of, a mobile device (e.g., a mobile telephone or so-called "smartphone," or other mobile device), a camera (e.g., a digital camera, an Internet Protocol (IP) camera, a camera of a mobile device), a smart wearable device, an extended reality device (e.g., a virtual reality (VR) device, an augmented reality (AR) device, or a mixed reality (MR) device), a personal computer, a laptop computer, a multi-camera system, a vehicle or a computing device or system of a vehicle, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 4A is a diagram illustrating an example of motion estimation for extrapolating a camera frame, in accordance with some examples of the present disclosure;

FIG. 4B is a diagram illustrating another example motion estimation for extrapolating a camera frame, in accordance with some examples of the present disclosure;

FIG. 6 is a flowchart illustrating an example process for synchronizing a frame rate of pass-through content from a camera sensor and a display refresh rate of a display, in accordance with some examples of the present disclosure.

DETAILED DESCRIPTION

Figure 1:
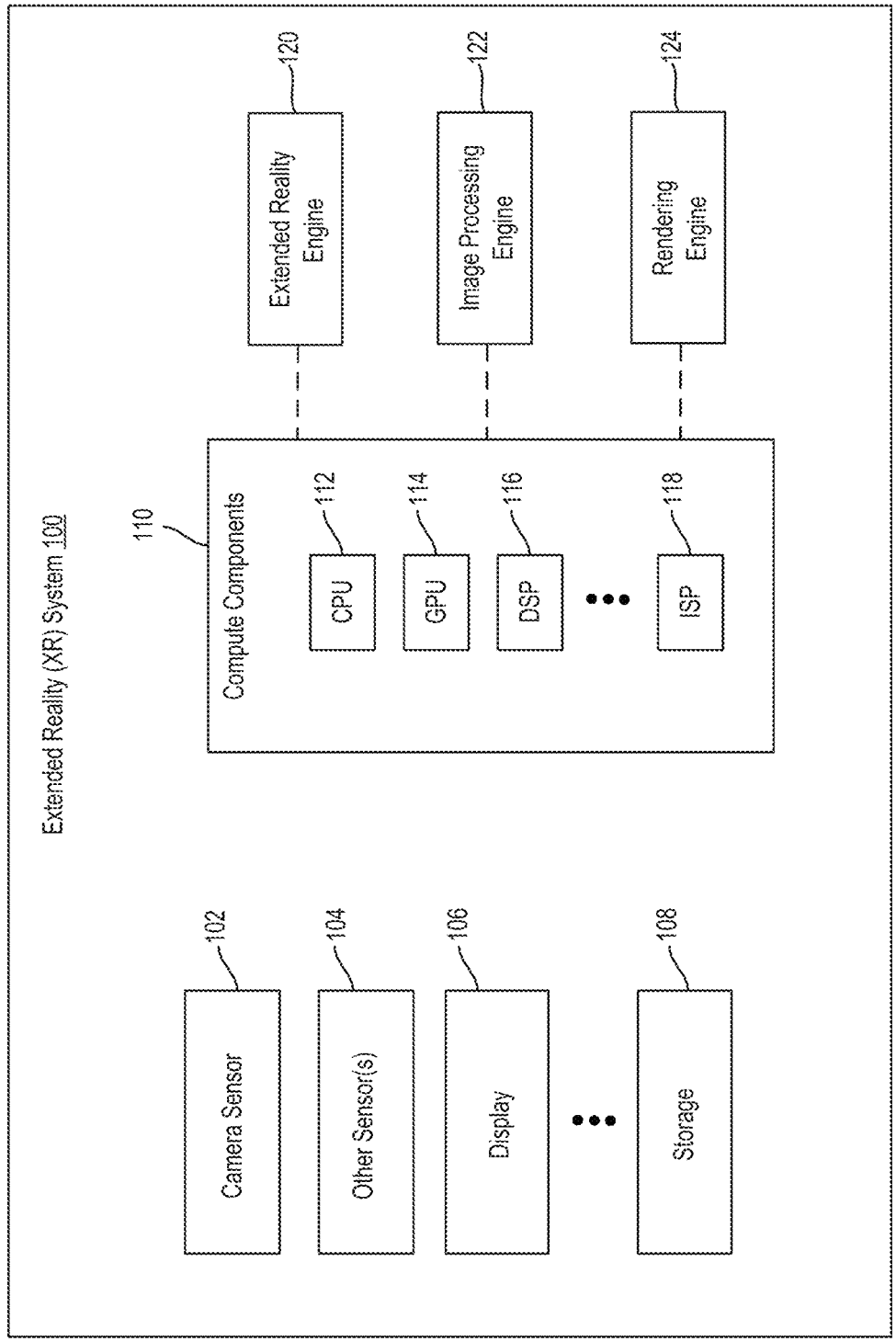
FIG. 1 is a simplified block diagram illustrating an example extended reality system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

As previously explained, extended reality (XR) devices can allow a user to experience or interact with immersive virtual environments or content. To provide realistic XR experiences, XR devices can integrate virtual content with the physical world and/or a video feed depicting a scene in the physical world. In some cases, the XR devices can match the relative pose and movement of objects and devices in the physical world. For example, an XR device can use tracking information to calculate the relative pose of devices, objects, and/or features of the real-world environment in order to match the relative position and movement of the devices, objects, and/or the real-world environment. In some cases, the XR device can use the pose and movement of one or more devices, objects, and/or the real-world environment to render content relative to the real-world environment in a convincing manner. The relative pose information can be used to match virtual content with the user's perceived motion and the spatio-temporal state of the devices, objects, and real-world environment.

One illustrative example of an XR device is a video pass-through or mixed reality device. A video pass-through or mixed reality device combines content rendered by the device with a depiction of a scene in the real world. In some examples, the XR device can capture camera images of a scene and combine the images of the scene with rendered content. For example, the device can combine a video feed captured by the XR device with rendered content during time warping operations (e.g., asynchronous reprojection). The video feed (e.g., the pass-through frames) can depict a scene (e.g., real-world environment) around a user of the XR device, and thus can allow the user to view virtual reality content rendered by the XR device along with a view of the scene as depicted in the video feed. The user can obtain the view of the scene through the video feed captured by the XR device, even if the XR device otherwise blocks or covers the user's eyes and the user's visibility of the scene.

In some cases, if the camera frame rate (e.g., the rate at which the camera of the device captures frames) does not match the display refresh rate (e.g., the rate at which the display of the device presents new images) the images from the camera and the new images rendered by the display can become misaligned. Such misalignment can cause artifacts in the displayed content and/or an unrealistic experience for the user of the device. For example, sometimes the display refresh rate of an XR device and the camera frame rate of a camera of the XR device do not match, which can cause a timing misalignment between the pass-through content from the camera and the content rendered by the XR device based on the display refresh rate. In many cases, the camera of the XR device can make compromises between resolution and frame rates, such as trading higher resolution for a decreased frame rate, which can also result in a timing misalignment between the pass-through content from the camera and the content rendered by the XR device based on the display refresh rate. However, a mismatch between the display refresh rate (e.g., and/or the frame rate of the frames rendered by the display of the XR device) and the camera pass-through frame rate (e.g., the camera frame rate) can produce undesirable artifacts.

Systems, apparatuses, processes (also referred to as methods), and computer-readable media (collectively referred to as "systems and techniques") are described herein for synchronizing a frame rate of pass-through content from a camera and a display refresh rate. In some aspects, the systems and techniques described herein can improve pass-through smoothness and reduce pass-through latency even if the camera frame rate of the XR device is different than (e.g., less) the display refresh rate of a display of the XR device. In some examples, the systems and techniques described herein can perform frame extrapolation based on motion estimation to predict a future pass-through camera frame for presentation at the XR device and ensure that the rate of pass-through camera frames matches (or significantly matches) the display refresh rate. For example, if the camera frame rate is less than the display refresh rate, the camera of the XR device may not be able to produce pass-through frames at the same rate as the display refresh rate (e.g., at the same rate as new frames are rendered by the XR device based on the display refresh rate). To increase the rate of pass-through frames produced for display in a mixed reality or pass-through experience, the XR device can predict future camera frames based on previously-captured camera frames. In some examples, the XR device can predict a future camera frame faster than the camera of the XR device can capture a new frame. Thus, by predicting a future camera frame used for pass-through, the XR device can increase the rate of pass-through frames consistent with the display refresh rate.

In some aspects, the XR device can combine camera frames captured by the camera with predicted future frames to increase the rate of pass-through frames provided to the display for rendering in combination with virtual content. As such, some of the pass-through frames displayed by the XR device can include frames captured by the camera of the XR device and frames predicted based on previous frames captured by the camera of the XR device. In some cases, the XR device can estimate an optical flow between two or more previous frames captured by the camera, and use the optical flow to predict a future frame for use as a pass-through frame. The XR device can perform frame extrapolation based on the optical flow to predict the future frame. In some cases, the XR device can use current and previous camera frames combined with head pose information to estimate motion between frames. Moreover, the XR device can use an estimated motion vector field to extrapolate a future pass-through camera frame from a previously-captured frame (e.g., the last frame captured by the camera of the XR device). In some examples, the XR device can use motion estimation to perform time warp based extrapolation during frame composition. In some cases, the XR device can process motion estimation and frame extrapolation information on one or more buffers (e.g., one or more offscreen buffers).

In some cases, when predicting a future frame, the XR device can determine a magnitude of motion between previous frames, and scale the motion used to predict a future frame based on the magnitude of motion between the previous frames. For example, the amount of motion estimated between camera frame number 1 and camera frame number 3 may be higher than the amount of motion expected for future camera frame number 4. Accordingly, the XR device can determine the magnitude of motion between camera frame number 1 and camera frame number 3 and use the magnitude of motion to scale the estimated motion between camera frame number 3 and future camera frame number 4. In some examples, the XR device can scale the estimated motion between camera frame number 3 and future camera frame number 4 to match the ratio of motion between camera frame number 1 and camera frame number 3. For example, the XR device can calculate the ratio between the amount of time that elapsed between camera frames numbers 1 and 3 and the amount of time between the future camera frame number 4 and the display time of future camera frame number 4, and use the ratio of those times to intelligently adapt the magnitude of motion applied for future camera frame number 4.

In some aspects, the XR device can calculate a base point of motion vectors to use for the camera frame extrapolation. For example, if the XR device uses standard optical flow to estimate motion vectors for two input frames with motion from point A to point B, the motion vectors may indicate that the XR device should apply motion from point A to point B. However, for frame extrapolation, the XR device may instead need to move point B forward. In other words, with standard optical flow, the motion vectors may cause the XR device to move a frame region behind a target depicted in the frames, instead of moving the target depicted in the frames as intended. To avoid such issues, the XR device may calculate the motion vectors backwards and invert the calculated motion vectors to obtain a base point of the motion vectors that projects forward. To illustrate, using the previous example of frames with motion from point A to point B, the XR device can estimate the optical flow from point B to point A, and invert the corresponding motion vector to obtain a motion vector with a base point and projecting motion forward from point B.

In some cases, the XR device can use time warp (e.g., asynchronous reprojection) to correct the rotational motion between frames, and use optical flow to correct the translational motion between frames. For example, time warp can generally correct rotational motion efficiently and accurately. Accordingly, the XR device can use time warp to correct the rotational motion in an extrapolated camera frame. The XR device can reproject the extrapolated camera frame with the translational motion but without the rotational motion. For example, the XR device can subtract the rotational motion between frames from the estimated motion, and use the resulting translational motion to estimate the future camera frame. The XR device can use time warp to correct the rotational motion in the future camera frame. In some examples, the XR device can determine a pose of the XR device when it captured previous camera frames used to extrapolate a future camera frame. Before determining and/or applying the optical flow for the future camera frame, the XR device can use the pose information to reproject the previous camera frames without the rotational motion. The XR device can then use the reprojected previous camera frames to estimate the optical flow for the future camera frame, and use time warp to fix the rotational motion in the future camera frame.

In some cases, the XR device can fix and/or project different types of motion. For example, the XR device can fix and/or project rotational head movement (e.g., three degrees of freedom or "3DOF"). The rotational movement can include rotations around each axis. The XR device can use time warp to correct rotational movement by applying rotational transforms to the camera frame. Moreover, the XR device can fix and/or project translational head movement (e.g., six degrees of freedom or "6DOF"). The translational movement can include translations along each axis. The XR device can also fix and/or project object movements in a scene. The object movements can correspond to objects that are in motion in the scene and have changed position between camera frames. In some examples, the motion estimation described herein can cover the rotational movement (e.g., 3DOF), the translational movement (e.g., 6DOF), and the object movements.

In some examples, the XR device can use time warp to correct and/or estimate simple movement types, such as rotational movements. In some cases, the motion estimation and frame extrapolation described herein may be more accurate if those types of movements are removed prior to motion estimation. For example, if time warp is configured to estimate 3DOF rotational movement, before applying motion estimation and frame extrapolation as described herein, the XR device can reproject the input frames without the 3DOF movement (e.g., such that the 3DOF movement has been removed). The motion estimation and frame extrapolation are focused on 6DOF and object movement. The 3DOF correction may be applied by time warp after the frame has been extrapolated. In some examples, in the case of 3DOF reprojection, the XR device can align the input frames using a matrix transform. In the case of a 3DOF plus 6DOF reprojection, the XR device can use a mesh render with the depth information applied to the mesh geometry to achieve the 3DOF plus 6DOF transformation.

In some cases, for frame extrapolation, the XR device can texture map previous camera frames to a grid of geometric shapes. The XR device can move the positions of the vertices in the grid based on the motion of the regions of the camera frame determined during motion estimation. This can shift and manipulate regions of the camera frame in accordance with their historical motion in order to move objects into their location predicted by the inverse backwards motion estimation previously described.

In some cases, the XR device can perform extrapolation by moving a geometry or by moving UV texture coordinates. For example, the XR device can perform an extrapolation render pass by moving a geometry of a mesh or manipulating UV texture coordinates to change how the source camera frame is mapped to the geometry. In some cases, the XR device can distort a mesh by moving the geometry of the mesh. In some examples, when moving the geometry, the XR device can move each vertex during the vertex shader pass based on the motion vector magnitude and direction at a corresponding point. In some examples, when moving texture coordinates, the XR device can determine the inverse movement and use the inverse to adjust the texture coordinates.

Examples of the systems and techniques described herein for processing data are illustrated in FIG. 1 through FIG. 7 and described below.

FIG. 1 is a diagram illustrating an example extended reality (XR) system 100, in accordance with some examples of the disclosure. The XR system 100 can implement the systems and techniques disclosed herein. The XR system 100 can perform various tasks and operations such as, for example, extended reality tasks and operations (e.g., tracking, mapping, localization, content rendering, pose estimation, object detection/recognition, video pass-through, etc.), image/video processing and/or post-processing, data processing and/or post-processing, computer graphics, machine vision, object modeling and registration, multimedia rendering and/or composition, time warping, frame extrapolation, synchronization of display refresh rates and video pass-through frame rates, and/or any other data processing tasks, effects, and/or computations.

In some examples, the XR system 100 can synchronize a frame rate of pass-through content from a camera sensor and a display refresh rate. The XR system 100 can improve the smoothness of pass-through frames and reduce pass-through latency even if the camera frame rate of the XR device is different than (e.g., less than) the display refresh rate of a display of the XR device. In some examples, the XR system 100 can perform frame extrapolation based on motion estimation to predict a future pass-through camera frame for presentation at the XR device and ensure that the rate of pass-through camera frames (including extrapolated camera frames) matches (or significantly matches) the display refresh rate. For example, if the camera frame rate is less than the display refresh rate, a camera sensor (e.g., camera sensor 102) of the XR system 100 may not be able to produce pass-through frames at the same rate as the display refresh rate (e.g., at the same rate as new frames are rendered by the XR system 100 based on the display refresh rate). To increase the rate of pass-through frames produced for display in a mixed reality or pass-through experience, the XR system 100 can predict future camera frames based on previously-captured camera frames. In some examples, the XR system 100 can predict a future camera frame faster than a camera sensor of the XR system 100 can capture a new frame. Thus, by predicting a future camera frame used for pass-through, the XR system 100 can increase the rate of pass-through frames consistent with the display refresh rate.

In some examples, the XR system 100 can perform tracking and localization; pose estimation, mapping of the physical world/environment (e.g., a scene) around the XR system 100 (e.g., where the XR system 100 is located); and positioning and rendering of virtual content on a screen, display, and/or visible plane/region as part of an XR experience. For example, the XR system 100 can generate a map (e.g., a three-dimensional (3D) map) of a scene in the physical world, track a pose (e.g., a location and orientation) of the XR system 100 relative to the scene (e.g., relative to the 3D map of the scene), position and/or anchor virtual content in a specific location(s) on the map of the scene, and render the virtual content on a display (e.g., display 106) such that the virtual content appears to be at a physical location in the scene corresponding to the specific location on the map of the scene where the virtual content is positioned and/or anchored.

In the example shown in FIG. 1, the XR system 100 includes a camera sensor 102, one or more other sensors 104, a display 106, storage 108, compute components 110, an XR engine 120, an image processing engine 122, and a rendering engine 124. It should be noted that the components 102 through 126 shown in FIG. 1 are non-limiting examples provided for illustration and explanation purposes, and other examples can include more, less, and/or different components than those shown in FIG. 1. For example, in some cases, the XR system 100 can include one more other processing engines, one or more receivers (e.g., global positioning systems, global navigation satellite systems, etc.), one or more communications devices (e.g., radio frequency (RF) interfaces and/or any other wireless/wired communications receivers/transmitters), one or more other hardware components, and/or one or more other software and/or hardware components that are not shown in FIG. 1. An example architecture and example hardware components that can be implemented by the XR system 100 are further described below with respect to FIG. 7.

The XR system 100 can be part of, or implemented by, a single computing device or multiple computing devices. In some examples, the XR system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a smart television, a display device, a gaming console, a video streaming device, an IoT (Internet-of-Things) device, a smart wearable device (e.g., a head-mounted display (HMD), smart glasses, etc.), or any other suitable electronic device(s).

In some implementations, the camera sensor 102, the one or more other sensor(s) 104, the display 106, the storage 108, the compute components 110, the XR engine 120, the image processing engine 122, and rendering engine 124 can be part of the same computing device. For example, in some cases, the camera sensor 102, the one or more other sensor(s) 104, the display 106, the storage 108, the compute components 110, the XR engine 120, the image processing engine 122, and rendering engine 124 can be integrated into a smartphone, laptop, tablet computer, smart wearable device, gaming system, and/or any other computing device. In other implementations, the camera sensor 102, the one or more other sensor(s) 104, the display 106, the storage 108, the compute components 110, the XR engine 120, the image processing engine 122, and rendering engine 124 can be part of two or more separate computing devices. For example, in some cases, some of the components 102 through 124 can be part of, or implemented by, one computing device and the remaining components can be part of, or implemented by, one or more other computing devices.

The camera sensor 102 can include any image and/or video sensor or capturing device, such as a digital camera sensor, a video camera sensor, a smartphone camera sensor, an image/video capture device on an electronic apparatus such as a television or computer, a camera, etc. In some cases, the camera sensor 102 can be part of a camera or computing device such as an XR device (e.g., an HMD, smart glasses, etc.), a digital camera, a smartphone, a smart television, a game system, etc. In some examples, the camera sensor 102 can be part of a multiple-camera assembly, such as a dual-camera assembly. The camera sensor 102 can capture image and/or video content (e.g., raw image and/or video data), which can then be processed by the compute components 110, the XR engine 120, the image processing engine 122, and/or the rendering engine 124 as described herein.

In some examples, the camera sensor 102 can capture image data and generate frames based on the image data and/or provide the image data or frames to the XR engine 120, the image processing engine 122, and/or the rendering engine 124 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

For simplicity and explanation purposes, FIG. 1 illustrates a single camera sensor on the XR system 100. However, in other examples, the XR system 100 can include multiple camera sensors. Moreover, references to any of the components of the XR system 100 in the singular or plural form should not be interpreted as limiting the number of such components implemented by the XR system 100 to one or more than one. For example, references to a processor in the singular form should not be interpreted as limiting the number of processors implemented by the XR system 100 to one. One of ordinary skill in the art will recognize that, for any of the components shown in FIG. 1, the XR system 100 can include only one of such component(s) or more than one of such component(s).

The one or more other sensor(s) 104 can include any type of sensor or sensors. For example, in some cases, the one or more other sensor(s) 104 can include one or more inertial measurement units (IMUs), one or more radio detection and ranging (RADAR) sensors, one or more light detection and ranging (LIDAR) sensors, one or more acoustic/sound sensors, one or more infrared (IR) sensors, one or more magnetometers, one or more touch sensors, one or more laser rangefinders, one or more light sensors, one or more proximity sensors, one or more motion sensors, one or more active pixel sensors, one or more machine vision sensors, one or more ultrasonic sensors, a smart scene sensor, and/or any other sensor or combination of sensors.

In some cases, the one or more other sensors(s) 104 can measure a pose of the XR system 100, motion of the XR system 100, and/or one or more characteristics of the environment around the XR system 100. In some examples, the one or more other sensor(s) 104 can detect a specific force and angular rate of the XR system 100. In some cases, the one or more other sensor(s) 104 can detect an orientation of the XR system 100. The one or more other sensor(s) 104 can generate linear acceleration measurements, rotational rate measurements, and/or heading measurements. In some examples, the one or more other sensor(s) 104 can be used to measure the pitch, roll, and yaw of the XR system 100. In some cases, the XR engine 120 can use data and/or measurements from the camera sensor 102 and/or the one or more other sensor(s) 104 to track a pose of the XR system 100.

The display 106 can include any display device used to display content, such as virtual reality content, video pass-through content, and/or any type of content. In some examples, the display 106 can include a screen configured to output digital content (e.g., images, video, graphics, and/or any type of visual content). The display 106 can display content at one or more display resolutions and/or one or more display refresh rates.

The storage 108 can be any storage device(s) for storing data. Moreover, the storage 108 can store data from any of the components of the XR system 100. For example, the storage 108 can store data from the camera sensor 102 (e.g., image or video data), data from the one or more other sensor(s) 104 (e.g., measurements), data from the compute components 110 (e.g., processing parameters, preferences, virtual content, rendering content, scene maps, tracking and localization data, object detection data, video frames, configurations, XR application data, recognition data, outputs, calculation results, etc.), data from the XR engine 120, data from the image processing engine 122, and/or data from the rendering engine 124 (e.g., output frames). In some examples, the storage 108 can include a buffer for storing frames and/or other data for processing by the compute components 110.

The one or more compute components 110 can include a central processing unit (CPU) 112, a graphics processing unit (GPU) 114, a digital signal processor (DSP) 116, and/or an image signal processor (ISP) 118. The compute components 110 can perform various operations such as image enhancement, computer vision, graphics rendering, extended reality (e.g., tracking, localization, pose estimation, mapping, content anchoring, content rendering, video pass-through, etc.), image/video processing, sensor processing, recognition (e.g., text recognition, facial recognition, object recognition, feature recognition, tracking or pattern recognition, scene recognition, occlusion detection, etc.), machine learning, filtering, object detection, frame extrapolation, time warping, synchronization of display refresh rates and video pass-through frame rates, and/or any of the various operations described herein. In the example shown in FIG. 1, the compute components 110 can implement an XR engine 120, an image processing engine 122, and a rendering engine 124. In other examples, the compute components 110 can also implement one or more other processing engines.

The operations for the XR engine 120, the image processing engine 122, and the rendering engine 124 (and any other processing engines) can be implemented by any of the compute components 110. In one illustrative example, the operations of the rendering engine 124 can be executed by the GPU 114, and the operations of the XR engine 120 and the image processing engine 122 can be executed by the CPU 112, the DSP 116, and/or the ISP 118. In some cases, the compute components 110 can include other electronic circuits or hardware, computer software, firmware, or any combination thereof, to perform any of the various operations described herein.

In some examples, the XR engine 120 can perform XR operations based on data from the camera sensor 102, the one or more other sensor(s) 104, and/or the storage 108. In some examples, the XR engine 120 can perform tracking, localization, pose estimation, mapping, content anchoring, motion estimation, and/or any other XR operations/functionalities. In some examples, the XR engine 120 can coordinate with the image processing engine 122 and/or the rendering engine 124 to render user interfaces, control objects, virtual content, pass-through camera frames, mixed reality content, and/or any other visual content.

The image processing engine 122 can perform one or more image processing operations. In some examples, the image processing engine 122 can perform image processing operations based on data from the camera sensor 102, the one or more other sensor(s) 104, the storage 108, and/or one or more other devices or components. In some examples, the image processing engine 122 can also use data from other devices or applications, such as data from or reported by other user devices and/or data provided by a user of the XR system 100.

The image processing engine 122 can perform image processing operations such as, for example, filtering, demosaicing, scaling, color correction, color conversion, segmentation, noise reduction filtering, spatial filtering, artifact correction, etc. The rendering engine 124 can obtain image data generated and/or processed by the compute components 110, the camera sensor 102, the XR engine 120, and/or the image processing engine 122, and render content (e.g., virtual content, videos, images, etc.) for presentation on the display 106.

In some examples, the image processing engine 122 can calculate a pose of the XR system 100, calculate motion in frames captured by the camera sensor 102, perform time warping operations, extrapolate future frames based on previous frames, synchronize display refresh rates with video pass-through frame rates, and/or perform any other operation as described herein. In some examples, the image processing engine 122 can use data from the camera sensor 102, the one or more other sensor(s) 104, the storage 108, and/or any other components to detect objects (e.g., edges, surfaces, items on surfaces, windows, doors, walls, tables, books, devices, chairs, humans, hands, animals, etc.) in a scene, identify characteristics of a scene and/or objects in a scene, identify occlusions in a scene, etc.

In some examples, the XR engine 120, the image processing engine 122, and/or the rendering engine 124 can perform various operations to provide an XR experience to a user of the XR system 100. An XR experience can include use of the XR system 100 to present XR content (e.g., virtual reality content, augmented reality content, mixed reality content, etc.) to a user associated with the XR system 100 (e.g., a user wearing the XR system 100 and/or otherwise using the XR system 100 for an XR experience). In some examples, the XR content and experience can be provided by the XR system 100 through an XR application that provides a specific XR experience such as, for example, an XR gaming experience, an XR classroom experience, an XR shopping experience, an XR entertainment experience, an XR activity (e.g., an operation, a troubleshooting activity, etc.), among others. During the XR experience, the user can view and/or interact with virtual content using the XR system 100. In some cases, the user can view and/or interact with the virtual content while also being able to view and/or interact with a physical environment depicted by frames captured by the camera sensor 102, allowing the user to have an immersive experience between the physical environment and virtual content mixed or integrated with the frames depicting the physical environment.

While the XR system 100 is shown to include certain components, one of ordinary skill will appreciate that the XR system 100 can include more or fewer components than those shown in FIG. 1. For example, the XR system 100 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the XR system 100 is described below with respect to FIG. 7.

Figure 2:
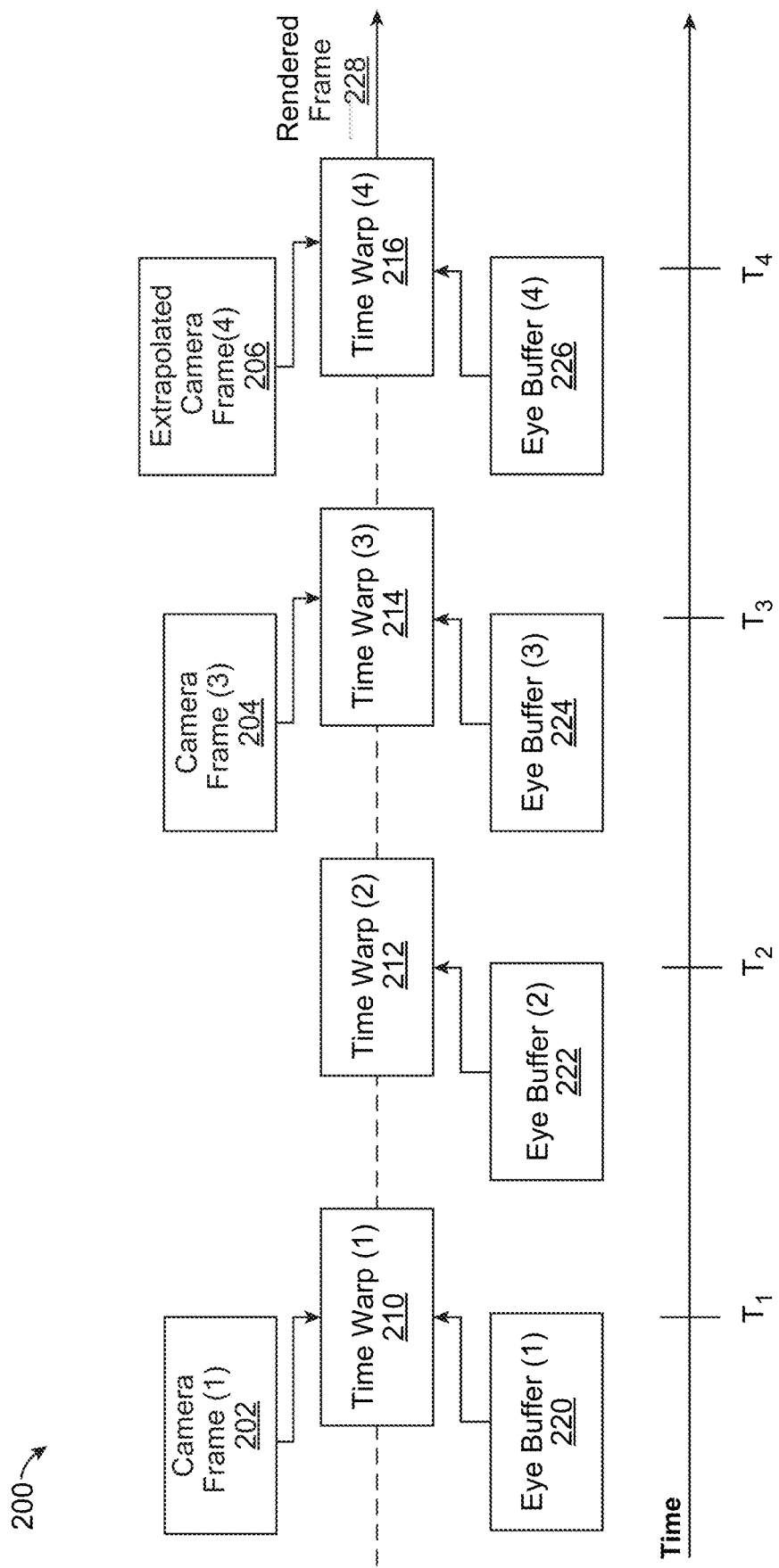
FIG. 2 is a diagram illustrating an example flow for extrapolating a pass-through camera frame to synchronize a frame rate of pass-through camera frames and a display refresh rate, in accordance with some examples of the present disclosure.

FIG. 2 is a diagram illustrating an example flow 200 for extrapolating a pass-through camera frame to synchronize a frame rate of pass-through camera frames and a display refresh rate. The flow 200 can combine camera frames obtained from the camera sensor 102 with virtual content rendered by the XR system 100 to provide a mixed reality experience to a user wearing the XR system 100. The camera frames from the camera sensor 102 can capture a scene around the user (e.g., a scene in the physical world) and can be used as pass-through camera frames to allow the user to see the scene (e.g., through the pass-through camera frames) even if the user is otherwise unable to see the scene while wearing the XR system 100 (e.g., because the XR system 100 blocks the user's eyes and/or visibility of the scene). The XR system 100 can render the virtual content along with the pass-through camera frames to provide the user a mixed reality experience where the user can see virtual content rendered within a depiction of the scene from the pass-through camera frames.

In this example flow 200, at time $t_1$, a time warp process 210 receives a first camera frame 202 captured by the camera sensor 102 and virtual content from the eye buffer 220, and generates a rendered frame for presentation (e.g., via display 106) to the user of the XR system 100. The rendered frame can be a mixed reality frame generated from the first camera frame 202 captured by the camera sensor 102 and the virtual content from the eye buffer 220. For example, to generate the rendered frame, the time warp process 210 can combine the first camera frame 202 with the virtual content from the eye buffer 220. The first camera frame 202 can depict a scene around the user wearing the XR system 100, and the virtual content can include rendered content generated by the XR system 100 (e.g., via an application of the XR system 100, such as an XR application). Thus, the rendered frame can depict the virtual content from the eye buffer 220 within a view of the scene depicted by the first camera frame 202.

In generating the rendered frame, the time warp process 210 can warp or reproject the rendered frame before sending it to the display 106 for presentation to the user. The time warp process 210 can warp or reproject the rendered frame to compensate for movement of the XR system 100 (e.g., and thus the head movement of the user). In some examples, the time warp process 210 can warp or reproject the rendered frame to account for movement that occurred after generating the rendered frame and before displaying the rendered frame (e.g., the time when the rendered frame is sent to the display 106 and/or the time when the display 106 is refreshed to update or refresh the content displayed by the display 106 (e.g., at a display refresh time)). In some cases, the time warp process 210 can warp or reproject the rendered frame to also account for movement that occurred between the time the first camera frame 202 was captured by the camera sensor 102 and the time the rendered frame is displayed at the display 106 (and/or the time the rendered frame is sent to the display 106 for presentation to the user).

In some examples, the time warp process 210 can warp the rendered frame by geometrically distorting or reprojecting the rendered frame to account for the movement since the rendered frame was generated and/or since the first camera frame 202 was captured by the camera sensor 102. In some cases, the time warp process 210 can warp the rendered frame to compensate for rotational movement (e.g., three degrees of freedom (3DOF) movement) of the XR system 100 (and/or the rotational movement of the head of the user wearing the XR system 100). For example, the time warp process 210 can warp the rendered frame geometrically in the direction that the XR system 100 rotated (and/or the direction the user wearing the XR system 100 rotated the user's head) between the time the rendered frame was generated (and/or the time the first camera frame 202 was captured by the camera sensor 102) and the time the rendered frame is sent to the display 106 and/or displayed at the display 106. In some examples, the time warp process 210 can rotate the rendered frame around each axis of rotation. In some cases, the time warp process 210 can compensate for the rotational movement by applying a rotational transform to the rendered frame to be displayed to the user of the XR system 100.

In some cases, the warping or reprojection performed by the time warp process 210 can also compensate for translational movement (e.g., six degrees of freedom (6DOF) movement) of the XR system 100 (and/or the head of the user wearing the XR system 100). For example, the time warp process 210 can warp the rendered frame geometrically in the direction of the translational movement of the XR system 100 between the time the rendered frame was generated (and/or the time the first camera frame 202 was captured by the camera sensor 102) and the time the rendered frame is sent to the display 106 and/or displayed at the display 106. In some examples, the time warp process 210 can apply a translation to the rendered frame around each axis of translation. In some cases, the time warp process 210 can compensate for the translational movement by using depth information about the rendered frame and approximating how areas of the rendered frame would move due to parallax.

At time $t_2$, the time warp process 212 can obtain virtual content from the eye buffer 222 to generate a new rendered frame for presentation by the display 106 at the next display refresh time of the display 106. Because the display refresh rate of the display 106 is less than the camera frame rate of the camera sensor 102, the time warp process 212 is unable to obtain a new camera frame from the camera sensor 102 at time $t_2$. Thus, the time warp process 212 can generate the new rendered frame based on the camera frame 202 obtained at time $t_1$ and the virtual content from the eye buffer 222. In some examples, when generating the new rendered frame, the time warp process 212 can warp or reproject the new rendered frame to compensate for movement as previously explained. In some examples, the time warp process 212 can compensate for movement since the virtual content from the eye buffer 222 was rendered and/or the new rendered frame was generated, and the time that the new rendered frame is sent to the display 106 and/or the time the new rendered frame is displayed at the display 106. In some cases, the time warp process 212 can warp or reproject the camera frame 202 to compensate for movement since the camera frame 202 was captured by the camera sensor 102 (or the time the camera frame 202 was warped by the time warp process 210) and the time that the new rendered frame is sent to the display 106 and/or the time the new rendered frame is displayed at the display 106.

At time $t_3$, the camera sensor 102 can have a second camera frame 204 ready for presentation by the XR system 100. For example, the camera frame rate of the camera sensor 102 can be such that the camera sensor 102 can generate and provide a new camera frame at every other time interval (e.g., at time $t_1$ followed by time $t_3$), where each time interval is based on or controlled by the display refresh rate of the display 106. Thus, at time $t_3$, the time warp process 214 can obtain the second camera frame 204 from the camera sensor 102 and additional virtual content from the eye buffer 224, to generate a new rendered frame for presentation by the display 106 at the next display refresh time of the display 106.

The new rendered frame can be a mixed reality frame generated from the second camera frame 204 and the additional virtual content from the eye buffer 224. For example, to generate the new rendered frame at time $t_3$, the time warp process 214 can combine the second camera frame 204 with the additional virtual content from the eye buffer 224. The second camera frame 204 can depict a scene around the user wearing the XR system 100, and the additional virtual content can include rendered content generated by the XR system 100 (e.g., via an application of the XR system 100, such as an XR application). Thus, the new rendered frame can depict the virtual content from the eye buffer 224 within a view of the scene depicted by the second camera frame 204.

In generating the new rendered frame, the time warp process 214 can warp or reproject the new rendered frame before sending it to the display 106 for presentation to the user. The time warp process 214 can warp or reproject the new rendered frame to compensate for movement of the XR system 100 (e.g., and thus the head movement of the user). In some examples, the time warp process 214 can warp or reproject the new rendered frame to account for movement that occurred after generating the new rendered frame and before displaying the new rendered frame (e.g., the time when the new rendered frame is sent to the display 106 and/or the time when the display 106 is refreshed to update or refresh the content displayed by the display 106 (e.g., at a display refresh time)). In some cases, the time warp process 214 can warp or reproject the new rendered frame to also account for movement that occurred between the time the second camera frame 204 was captured by the camera sensor 102 and the time the new rendered frame is displayed at the display 106 (and/or the time the new rendered frame is sent to the display 106 for presentation to the user).

In some examples, the time warp process 214 can warp the rendered frame by geometrically distorting or reprojecting the new rendered frame to account for the movement since the new rendered frame was generated and/or since the second camera frame 204 was captured by the camera sensor 102. In some cases, the time warp process 214 can warp the new rendered frame to compensate for rotational movement of the XR system 100 (and/or the rotational movement of the head of the user wearing the XR system 100). In some cases, the warping or reprojection performed by the time warp process 214 can also compensate for translational movement of the XR system 100 (and/or the head of the user wearing the XR system 100). For example, the time warp process 210 can warp the new rendered frame geometrically in the direction of the translational movement of the XR system 100 between the time the new rendered frame was generated (and/or the time the second camera frame 204 was captured by the camera sensor 102) and the time the new rendered frame is sent to the display 106 and/or displayed at the display 106.

At time $t_4$, the time warp process 216 can obtain additional virtual content from the eye buffer 226 to generate a new rendered frame 228 for presentation by the display 106 at the next display refresh time of the display 106. Because the display refresh rate of the display 106 is less than the camera frame rate of the camera sensor 102, the time warp process 216 is unable to obtain a new camera frame from the camera sensor 102 at time $t_4$. However, to synchronize the display refresh rate with the camera frame rate of the camera sensor 102, the XR system 100 (e.g., via the time warp process 216 or an application on the XR system 100) can extrapolate a new camera frame based on an optical flow between the first camera frame 202 and the second camera frame 204. For example, the XR system 100 can calculate a motion between the first camera frame 202 and the second camera frame 204, and use the calculated motion to generate the extrapolated camera frame 206. The extrapolated camera frame 206 can represent a predicted future frame.

The XR system 100 can generate the extrapolated camera frame 206 by adjusting the second camera frame 204 based on the optical flow between the first camera frame 202 and the second camera frame 204. In some examples, the XR system 100 can adjust a magnitude of the optical flow used to generate the extrapolated camera frame 206 based on the time intervals between the first camera frame 202 and the second camera frame 204, and the time interval between the second camera frame 204 and the extrapolated camera frame 206. For example, in the illustrative example shown in FIG. 2, the motion between the first camera frame 202 and the second camera frame 204 spans two time intervals (e.g., from time $t_1$ to time $t_2$ and from time $t_2$ to time $t_3$), whereas the motion between the second camera frame 204 and the extrapolated camera frame 206 spans from time $t_3$ to time $t_4$. Accordingly, instead of adjusting the second camera frame 204 based on the full motion between the first camera frame 202 and the second camera frame 204, the XR system 100 can scale the motion calculated between the first camera frame 202 and the second camera frame 204 according to the time interval between the second camera frame 204 and the extrapolated camera frame 206.

For example, the XR system 100 can determine the motion between the first camera frame 202 and the second camera frame 204. The XR system 100 can then determine the magnitude of the motion at each time interval. In some examples, to determine the magnitude of the motion, the XR system 100 can divide the motion between the first camera frame 202 and the second camera frame 204 by the number of time intervals after the first camera frame 202 until the second camera frame 204 (e.g., the number of time intervals that the motion spans). For example, in the illustrative example shown in FIG. 2, the motion between the first camera frame 202 and the second camera frame 204 spans a first time interval between time $t_1$ of the first camera frame 202 and time $t_2$, and a second time interval between time $t_2$ and time $t_3$ of the second camera frame 204. Thus, to determine the magnitude of the motion between the first camera frame 202 and the second camera frame 204, the XR system 100 can divide the motion between the first camera frame 202 and the second camera frame 204 by 2 (e.g., which accounts for the time intervals between the first camera frame 202 and the second camera frame 204). The XR system 100 can then use the magnitude of the motion calculated to generate the extrapolated camera frame 206. The magnitude of the motion can reflect an estimated amount of motion from time $t_3$ to time $t_4$.

In other words, the XR system 100 can scale the motion between the second camera frame 204 and the extrapolated camera frame 206 to match the ratio of motion between the first camera frame 202 and the second camera frame 204. To illustrate, the XR system 100 can calculate the ratio between the amount of time that elapsed between the first camera frame 202 and the second camera frame 204 and the amount of time between the second camera frame 204 and the extrapolated camera frame 206, and use the ratio of those times to intelligently adapt the magnitude of motion used to generate the extrapolated camera frame 206.

In some examples, the XR system 100 can generate the extrapolated camera frame 206 by using the magnitude of motion estimated to adjust the second camera frame 204. For example, the XR system 100 can adjust the second camera frame 204 by projecting the magnitude of motion forward (e.g., to the future) from time $t_3$ associated with the second camera frame 204 to time $t_4$ associated with the extrapolated camera frame 206.

In some cases, the XR system 100 can calculate a base point of motion vectors to use for the camera frame extrapolation. For example, if the XR system 100 uses standard optical flow to estimate motion vectors for the first camera frame 202 and the second camera frame 204 (e.g., from time $t_1$ to time $t_3$), the motion vectors can indicate that the XR system 100 should apply motion from time $t_1$ to time $t_3$. However, for frame extrapolation, the XR system 100 may instead need to apply motion from time $t_3$ (associated with the second camera frame 204) forward. In other words, with standard optical flow, the motion vectors may cause the XR system 100 to move a frame region behind a target depicted in the frames, instead of moving the target depicted in the frames as intended. To avoid such issues, the XR system 100 may calculate the motion vectors backwards and invert the calculated motion vectors to obtain a base point of the motion vectors that projects forward. To illustrate, the XR system 100 can estimate the optical flow from time $t_1$ to time $t_3$, and invert the corresponding motion vector to obtain a motion vector with a base point and projecting motion forward from time $t_3$.

In some cases, the time warp process 216 can correct the rotational motion between the second camera frame 204 and the extrapolated camera frame 206, and use optical flow to correct the translational motion between the second camera frame 204 and the extrapolated camera frame 206. For example, time warp can generally correct rotational motion efficiently and accurately. Accordingly, the XR system 100 can use the time warp process 216 to correct the rotational motion in the extrapolated camera frame 206. The XR system 100 can reproject the extrapolated camera frame 206 with the translational motion but without the rotational motion. For example, the XR system 100 can subtract the rotational motion between the second camera frame 204 and the extrapolated camera frame 206 from the estimated motion, and use the resulting translational motion to estimate the extrapolated camera frame 206. The XR system 100 can use the time warp process 216 to correct the rotational motion in the extrapolated camera frame 206. In some examples, the XR system 100 can determine a pose of the XR system 100 when it captured the second camera frame 204 used to generate the extrapolated camera frame 206. Before determining and/or applying the optical flow for the extrapolated camera frame 206, the XR system 100 can use the pose information to reproject the second camera frame 204 without the rotational motion. The XR system 100 can then use the reprojected second camera frame 204 to estimate the optical flow for the extrapolated camera frame 206, and use the time warp process 216 to fix the rotational motion in the extrapolated camera frame 206.

In other examples, the time warp process 216 can warp the extrapolated camera frame 206 to compensate for the translational and rotational motion of the XR system 100, and use optical flow to compensate for the translational motion of objects in the scene depicted by the extrapolated camera frame 206. The XR system 100 can fix and/or project different types of motion, as previously explained. For example, the XR system 100 can fix and/or project rotational movement of the XR system 100 (e.g., 3DOF movement). The time warp process 216 can correct the rotational movement by applying rotational transforms to the extrapolated camera frame 206. Moreover, the XR system 100 can fix and/or project translational movement of the XR system 100 (e.g., 6DOF movement). The XR system 100 can also fix and/or project object movements in a scene. The object movements can correspond to objects that are in motion in the scene and have changed position between camera frames. In some examples, the motion estimation and compensation can cover the rotational movement (e.g., 3DOF), the translational movement (e.g., 6DOF), and the object movements.

In some examples, the XR system 100 can use the time warp process 216 to correct and/or estimate simple movement types, such as rotational movements. In some cases, the motion estimation and frame extrapolation may be more accurate if those types of movements are removed prior to motion estimation. For example, if the time warp process 216 is configured to estimate 3DOF rotational movement, before applying motion estimation and frame extrapolation as described herein, the XR system 100 can reproject the extrapolated camera frame 206 without the 3DOF movement (e.g., such that the 3DOF movement has been removed). The motion estimation and frame extrapolation are focused on 6DOF and object movement. The 3DOF correction may be applied by the time warp process 216 after the extrapolated camera frame 206 has been generated. In some examples, in the case of 3DOF reprojection, the XR system 100 can align the extrapolated camera frame 206 using a matrix transform. In the case of a 3DOF plus 6DOF reprojection, the XR system 100 can use a mesh render with the depth information applied to the mesh geometry to achieve the 3DOF plus 6DOF transformation.

In some cases, for frame extrapolation, the XR system 100 can texture map the second camera frame 204 to a grid of geometric shapes. The XR system 100 can move the positions of the vertices in the grid based on the motion of the regions of the second camera frame 204 determined during motion estimation. This can shift and manipulate regions of the second camera frame 204 in accordance with their historical motion in order to move objects into their location predicted by the inverse backwards motion estimation previously described.

In some cases, the XR system 100 can perform camera frame extrapolation by moving a geometry or by moving UV texture coordinates. For example, the XR system 100 can perform an extrapolation render pass by moving a geometry of a mesh or manipulating UV texture coordinates to change how the second camera frame 204 is mapped to the geometry. In some cases, the XR system 100 can distort a mesh by moving the geometry of the mesh. In some examples, when moving the geometry, the XR system 100 can move each vertex during the vertex shader pass based on the motion vector magnitude and direction at a corresponding point. In some examples, when moving texture coordinates, the XR system 100 can determine the inverse movement and use the inverse to adjust the texture coordinates.

Once the time warp process 216 has completed generating/processing the extrapolated camera frame 206, the time warp process 216 can generate the new rendered frame 228 by combining the extrapolated camera frame 206 and the virtual content from the eye buffer 226. In some examples, the time warp process 216 can then warp or reproject the new rendered frame 228 as previously described. Once the time warp process 216 has completed generating and/or adjusting the new rendered frame 228, the time warp process 216 can provide the new rendered frame 228 to the display 106 for presentation to the user.

Figure 3A:
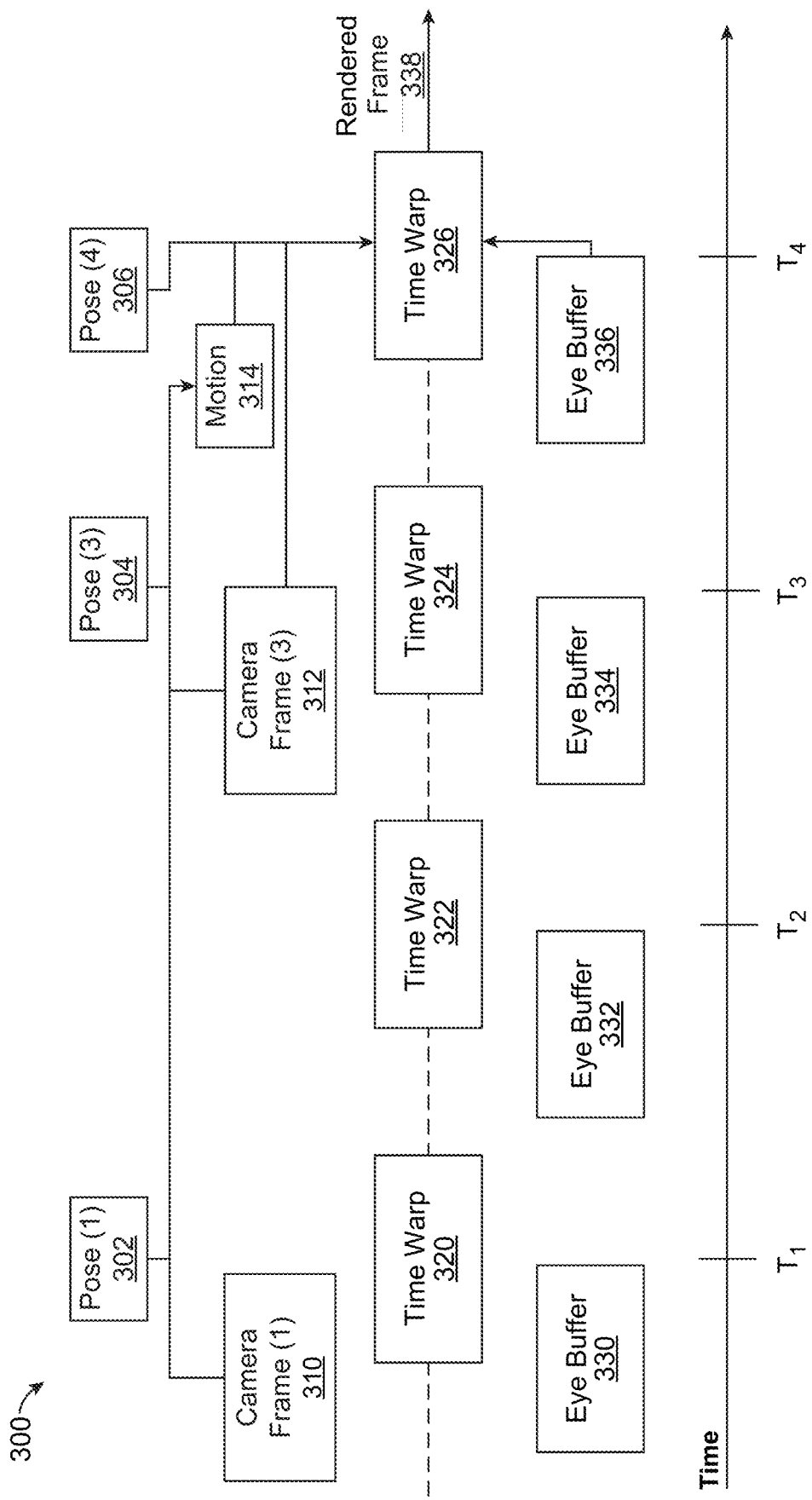
FIG. 3A is a diagram illustrating an example flow for extrapolating a pass-through camera frame to synchronize a frame rate of pass-through camera frames and a display refresh rate, in accordance with some examples of the present disclosure.

FIG. 3A is a diagram illustrating an example flow 300 for using a time warp process to extrapolate a pass-through camera frame. The flow 300 can combine camera frames obtained from the camera sensor 102 with virtual content rendered by the XR system 100 to provide a mixed reality experience to a user wearing the XR system 100. The camera frames from the camera sensor 102 can capture a scene around the user and can be used as pass-through camera frames to allow the user to see the scene (e.g., through the pass-through camera frames) even if the user is otherwise unable to see the scene while wearing the XR system 100 (e.g., because the XR system 100 blocks the user's eyes and/or visibility of the scene). The XR system 100 can render the virtual content along with the pass-through camera frames to provide the user a mixed reality experience where the user can see virtual content rendered within a depiction of the scene from the pass-through camera frames.

In this example flow 300, at time $t_1$, a time warp process 320 receives a first camera frame 310 captured by the camera sensor 102 and virtual content from the eye buffer 330, and generates a rendered frame for presentation (e.g., via display 106) to the user of the XR system 100. The rendered frame can be a mixed reality frame generated from the first camera frame 310 captured by the camera sensor 102 and the virtual content from the eye buffer 330. For example, to generate the rendered frame, the time warp process 320 can combine the first camera frame 310 with the virtual content from the eye buffer 330. The first camera frame 310 can depict a scene around the user wearing the XR system 100, and the virtual content can include rendered content generated by the XR system 100 (e.g., via an application of the XR system 100, such as an XR application). Thus, the rendered frame can depict the virtual content from the eye buffer 330 within a view of the scene depicted by the first camera frame 310.

In generating the rendered frame, the time warp process 320 can warp or reproject the rendered frame before sending it to the display 106 for presentation to the user. The time warp process 320 can warp or reproject the rendered frame to compensate for movement of the XR system 100 (e.g., and thus the head movement of the user). In some examples, the time warp process 320 can optionally obtain a pose 302 of the XR system 100 at the time that the first camera frame 310 was generated, and use the pose 302 of the XR system 100 to determine motion associated with the XR system 100 and/or compensate for movement of the XR system 100. In some cases, the time warp process 320 can use the pose 302 and motion information associated with the first camera frame 310 and/or the XR system 100 to estimate a future pose of the XR system 100 at the time the rendered frame is expected to be presented at the display 106, and warp or reproject the rendered frame at least partly based on the future pose.

For example, the time warp process 320 can use the pose 302 and motion information associated with the first camera frame 310 and/or the XR system 100 to estimate a future pose of the XR system 100 when the rendered frame is presented at the display 106 at a future time. The time warp process 320 can warp or reproject the rendered frame to account for any changes between the pose 302 and the estimated future pose. In some cases, the time warp process 320 can warp or reproject the rendered pose to account for the change in pose and/or to appear as if it's rendered from the perspective of the future pose.

In some examples, the time warp process 320 can warp or reproject the rendered frame to account for movement that occurred after generating the rendered frame and before displaying the rendered frame (e.g., the time when the rendered frame is sent to the display 106 and/or the time when the display 106 is refreshed to update or refresh the content displayed by the display 106 (e.g., at a display refresh time)). In some cases, the time warp process 320 can warp or reproject the rendered frame to also account for movement that occurred between the time the first camera frame 310 was captured by the camera sensor 102 and the time the rendered frame is displayed at the display 106 (and/or the time the rendered frame is sent to the display 106 for presentation to the user).

In some examples, the time warp process 320 can warp the rendered frame by geometrically distorting or reprojecting the rendered frame to account for the movement since the rendered frame was generated and/or since the first camera frame 310 was captured by the camera sensor 102. In some cases, the time warp process 320 can warp the rendered frame to compensate for rotational movement (e.g., 3DOF movement) of the XR system 100 (e.g., rotational movement of XR system 100 relative to the pose 302 of the XR system 100). For example, the time warp process 320 can warp the rendered frame geometrically in the direction that the XR system 100 rotated (and/or the direction the user wearing the XR system 100 rotated the user's head) between the time the rendered frame was generated (and/or the time the first camera frame 310 was captured by the camera sensor 102) and the time the rendered frame is sent to the display 106 and/or displayed at the display 106. In some examples, the time warp process 320 can rotate the rendered frame around any axis of rotation. In some cases, the time warp process 320 can compensate for the rotational movement by applying a rotational transform to the rendered frame to be displayed to the user of the XR system 100.

In some cases, the warping or reprojection performed by the time warp process 320 can also compensate for translational movement (e.g., 6DOF movement) of the XR system 100 (e.g., of the pose 302 of the XR system 100). For example, the time warp process 320 can warp the rendered frame geometrically in the direction of the translational movement of the XR system 100 between the time the rendered frame was generated (and/or the time the first camera frame 310 was captured by the camera sensor 102) and the time the rendered frame is sent to the display 106 and/or displayed at the display 106. In some examples, the time warp process 320 can apply a translation to the rendered frame around any axis of translation. In some cases, the time warp process 320 can compensate for the translational movement by using depth information about the rendered frame and approximating how areas of the rendered frame would move due to parallax.

At time $t_2$, the time warp process 322 can obtain virtual content from the eye buffer 332 to generate a new rendered frame for presentation by the display 106 at the next display refresh time of the display 106. Because the display refresh rate of the display 106 is less than the camera frame rate of the camera sensor 102, the time warp process 322 is unable to obtain a new camera frame from the camera sensor 102 at time $t_2$. Thus, the time warp process 322 can generate the new rendered frame based on the camera frame 310 obtained at time $t_1$ and the virtual content from the eye buffer 332. In some examples, when generating the new rendered frame, the time warp process 322 can warp or reproject the new rendered frame to compensate for movement as previously explained.

In some examples, the time warp process 322 can compensate for movement since the virtual content from the eye buffer 332 was rendered and/or the new rendered frame was generated, and the time that the new rendered frame is sent to the display 106 and/or the time the new rendered frame is displayed at the display 106. In some cases, the time warp process 322 can warp or reproject the camera frame 310 to compensate for movement since the camera frame 310 was captured by the camera sensor 102 (or the time the camera frame 310 was warped by the time warp process 320) and the time that the new rendered frame is sent to the display 106 and/or the time the new rendered frame is displayed at the display 106.

At time $t_3$, the camera sensor 102 can have a second camera frame 312 ready for presentation by the XR system 100. For example, the camera frame rate of the camera sensor 102 can be such that the camera sensor 102 can generate and provide a new camera frame at every other time interval (e.g., at time $t_1$ followed by time $t_3$), where each time interval is based on or controlled by the display refresh rate of the display 106. Thus, at time $t_3$, the time warp process 324 can obtain the second camera frame 312 from the camera sensor 102 and additional virtual content from the eye buffer 334, to generate a new rendered frame for presentation by the display 106 at the next display refresh time of the display 106.

The new rendered frame can be a mixed reality frame generated from the second camera frame 312 and the additional virtual content from the eye buffer 334. For example, to generate the new rendered frame at time $t_3$, the time warp process 324 can combine the second camera frame 312 with the additional virtual content from the eye buffer 334. The second camera frame 312 can depict a scene around the user wearing the XR system 100, and the additional virtual content can include rendered content generated by the XR system 100 (e.g., via an application of the XR system 100, such as an XR application). Thus, the new rendered frame can depict the virtual content from the eye buffer 334 within a view of the scene depicted by the second camera frame 312.

In generating the new rendered frame, the time warp process 324 can warp or reproject the new rendered frame before sending it to the display 106 for presentation to the user. The time warp process 324 can warp or reproject the new rendered frame to compensate for movement of the XR system 100 (e.g., and thus the head movement of the user).

In some cases, the time warp process 324 can optionally obtain a pose 304 of the XR system 100 at the time that the second camera frame 312 was generated, and use the pose 304 of the XR system 100 to determine motion associated with the XR system 100 and/or compensate for movement of the XR system 100. In some cases, the time warp process 324 can use the pose 304 and motion information associated with the second camera frame 312 and/or the XR system 100 to estimate a future pose of the XR system 100 at the time the rendered frame is expected to be presented at the display 106, and warp or reproject the rendered frame at least partly based on the future pose. In some cases, the XR system 100 can estimate the future pose of the XR system 100 and/or any movement associated with the new rendered frame (and/or the XR system 100) based on the pose 302 and the pose 304. For example, the XR system 100 can estimate the future pose of the XR system 100 and/or any movement associated with the new rendered frame (and/or the XR system 100) based on a change in the pose 302 and the pose 304 and/or estimated movement between the pose 302 and the pose 304.

In some examples, the XR system 100 can determine the magnitude of change between the pose 302 and the pose 304, and use the magnitude of change between the pose 302 and the pose 304 to estimate the future pose of the XR system 100 at the time that the new rendered frame will be presented at the display 106. The future pose of the XR system 100 can reflect a change in the pose 304 at the future time when the new rendered frame will be presented at the display 106. In some examples, such change in the pose 304 can be projected from the pose 304 to the future time based on the magnitude of change between the pose and the pose 304 and the estimated amount of time between the time of the pose 304 and the future time when the new rendered frame will be presented at the display 106.

In some examples, the time warp process 324 can warp or reproject the new rendered frame to account for movement that occurred after generating the new rendered frame and before displaying the new rendered frame (e.g., the time when the new rendered frame is sent to the display 106 and/or the time when the display 106 is refreshed to update or refresh the content displayed by the display 106 (e.g., at a display refresh time)). In some cases, the time warp process 324 can warp or reproject the new rendered frame to also account for movement that occurred between the time the second camera frame 312 was captured by the camera sensor 102 and the time the new rendered frame is displayed at the display 106 (and/or the time the new rendered frame is sent to the display 106 for presentation to the user).

In some examples, the time warp process 324 can warp the rendered frame by geometrically distorting or reprojecting the new rendered frame to account for the movement since the new rendered frame was generated and/or since the second camera frame 312 was captured by the camera sensor 102. In some cases, the time warp process 324 can warp the new rendered frame to compensate for rotational movement of the XR system 100 (and/or the rotational movement of the head of the user wearing the XR system 100). In some cases, the warping or reprojection performed by the time warp process 324 can also compensate for translational movement of the XR system 100 (and/or the head of the user wearing the XR system 100). For example, the time warp process 320 can warp the new rendered frame geometrically in the direction of the translational movement of the XR system 100 between the time the new rendered frame was generated (and/or the time the second camera frame 312 was captured by the camera sensor 102) and the time the new rendered frame is sent to the display 106 and/or displayed at the display 106.

At time $t_4$, the time warp process 326 can obtain additional virtual content from the eye buffer 336 to generate a new rendered frame 338 for presentation by the display 106 at the next display refresh time of the display 106. Because the display refresh rate of the display 106 is less than the camera frame rate of the camera sensor 102, the time warp process 326 is unable to obtain a new camera frame from the camera sensor 102 at time $t_4$. To synchronize the display refresh rate with the camera frame rate of the camera sensor 102, the time warp process 326 can extrapolate a new camera frame based on an optical flow between the first camera frame 310 and the second camera frame 312. For example, the time warp process 326 can calculate motion 314 between the first camera frame 310 and the second camera frame 312, and use the motion 314 to generate the extrapolated camera frame. The extrapolated camera frame can represent a predicted future frame. The time warp process 326 can then generate the new rendered frame 338 based on the extrapolated camera frame and the virtual content from the eye buffer 336.

The time warp process 326 can determine the motion 314 by estimating an optical flow between the first camera frame 310 and the second camera frame 312. In some cases, the time warp process 326 can additionally use the pose 302, the pose 304, and a pose 306 of the XR system 100 at time $t_4$ to calculate the motion 314 for determining the extrapolated camera frame. In some examples, the time warp process 326 can calculate the extrapolated camera frame from the perspective of the XR system 100 at pose 306.

In some examples, the time warp process 326 can generate the extrapolated camera frame by adjusting the second camera frame 312 based on the optical flow between the first camera frame 310 and the second camera frame 312. In some cases, the time warp process 326 can adjust a magnitude of the optical flow used to generate the extrapolated camera frame based on the time intervals between the first camera frame 310 and the second camera frame 312, and the time interval between the second camera frame 312 and the extrapolated camera frame. For example, in the illustrative example shown in FIG. 3A, the motion between the first camera frame 310 and the second camera frame 312 spans two time intervals (e.g., from time $t_1$ to time $t_2$ and from time $t_2$ to time $t_3$), whereas the motion between the second camera frame 312 and the extrapolated camera frame spans from time $t_3$ to time $t_4$. Accordingly, instead of adjusting the second camera frame 312 based on the full motion between the first camera frame 310 and the second camera frame 312, the time warp process 326 can scale the motion calculated between the first camera frame 310 and the second camera frame 312 according to the time interval between the second camera frame 312 and the extrapolated camera frame.

For example, the time warp process 326 can determine the motion between the first camera frame 310 and the second camera frame 312. The time warp process 326 can then determine the magnitude of the motion at each time interval. In some examples, to determine the magnitude of the motion, the time warp process 326 can divide the motion between the first camera frame 310 and the second camera frame 312 by the number of time intervals after the first camera frame 310 until the second camera frame 312 (e.g., the number of time intervals that the motion spans). For example, in the illustrative example shown in FIG. 3A, the motion between the first camera frame 310 and the second camera frame 312 spans a first time interval between time $t_1$ and time $t_2$, and a second time interval between time $t_2$ and time $t_3$. Thus, to determine the magnitude of the motion between the first camera frame 310 and the second camera frame 312, the time warp process 326 can divide the motion between the first camera frame 310 and the second camera frame 312 by 2 (e.g., which accounts for the time intervals between the first camera frame 310 and the second camera frame 312). The time warp process 326 can then use the magnitude of the motion calculated to generate the extrapolated camera frame. The magnitude of the motion can reflect an estimated amount of motion from time $t_3$ to time $t_4$.

In other words, the time warp process 326 can scale the motion between the second camera frame 312 and the extrapolated camera frame to match the ratio of motion between the first camera frame 310 and the second camera frame 312. To illustrate, the time warp process 326 can calculate the ratio between the amount of time that elapsed between the first camera frame 310 and the second camera frame 312 and the amount of time between the second camera frame 312 and the extrapolated camera frame, and use the ratio of those times to intelligently adapt the magnitude of motion used to generate the extrapolated camera frame.

In some examples, the time warp process 326 can generate the extrapolated camera frame by using the magnitude of motion estimated to adjust the second camera frame 312. For example, the time warp process 326 can adjust the second camera frame 312 by projecting the magnitude of motion forward (e.g., to the future) from time $t_3$ associated with the second camera frame 312 to time $t_4$ associated with the extrapolated camera frame.

In some cases, the time warp process 326 can calculate a base point of motion vectors to use for the camera frame extrapolation. For example, if the time warp process 326 uses standard optical flow to estimate motion vectors for the first camera frame 310 and the second camera frame 312 (e.g., from time $t_1$ to time $t_3$), the motion vectors can indicate that the time warp process 326 should apply motion from time $t_1$ to time $t_3$. However, for frame extrapolation, the time warp process 326 may instead need to apply motion from time $t_3$ (associated with the second camera frame 312) forward. In other words, with standard optical flow, the motion vectors may cause the time warp process 326 to move a frame region behind a target depicted in the frames, instead of moving the target depicted in the frames as intended. To avoid such issues, the time warp process 326 may calculate the motion vectors backwards and invert the calculated motion vectors to obtain a base point of the motion vectors that projects forward. For example, the time warp process 326 can estimate the optical flow from time $t_1$ to time $t_3$, and invert the corresponding motion vector to obtain a motion vector with a base point and projecting motion forward from time $t_3$.

In some cases, the time warp process 326 can correct the rotational motion between the second camera frame 312 and the extrapolated camera frame, and use optical flow to correct the translational motion between the second camera frame 312 and the extrapolated camera frame. For example, the time warp process 326 can correct the rotational motion in the extrapolated camera frame. The time warp process 326 can reproject the extrapolated camera frame with the translational motion but without the rotational motion. For example, the time warp process 326 can subtract the rotational motion between the second camera frame 312 and the extrapolated camera frame from the estimated motion, and use the resulting translational motion to estimate the extrapolated camera frame. The time warp process 326 can correct the rotational motion in the extrapolated camera frame. In some examples, the time warp process 326 can use the pose 302, the pose 304, and/or the pose 306 to reproject the second camera frame 312 without the rotational motion. The time warp process 326 can then use the reprojected second camera frame 312 to estimate the optical flow for the extrapolated camera frame, and can fix the rotational motion in the extrapolated camera frame.

In other examples, the time warp process 326 can warp the extrapolated camera frame to compensate for the translational and rotational motion of the XR system 100, and use optical flow to compensate for the translational motion of objects in the scene depicted by the extrapolated camera frame. The time warp process 326 can fix and/or project different types of motion, as previously explained. For example, the time warp process 326 can fix and/or project rotational movement of the XR system 100 (e.g., 3DOF movement). The time warp process 326 can correct the rotational movement by applying rotational transforms to the extrapolated camera frame. Moreover, the time warp process 326 can fix and/or project translational movement of the XR system 100 (e.g., 6DOF movement). The time warp process 326 can also fix and/or project object movements in a scene. The object movements can correspond to objects that are in motion in the scene and have changed position between camera frames. In some examples, the motion estimation and compensation can cover the rotational movement (e.g., 3DOF), the translational movement (e.g., 6DOF), and the object movements.

In some examples, the time warp process 326 can correct and/or estimate simple movement types, such as rotational movements. In some cases, the motion estimation and frame extrapolation may be more accurate if those types of movements are removed prior to motion estimation. For example, if the time warp process 326 is configured to estimate 3DOF rotational movement, before applying motion estimation and frame extrapolation as described herein, the time warp process 326 can reproject the extrapolated camera frame without the 3DOF movement (e.g., such that the 3DOF movement has been removed). The motion estimation and frame extrapolation are focused on 6DOF and object movement. The 3DOF correction may be applied by the time warp process 326 after the extrapolated camera frame has been generated. In some examples, in the case of 3DOF reprojection, the time warp process 326 can align the extrapolated camera frame using a matrix transform. In the case of a 3DOF plus 6DOF reprojection, the time warp process 326 can use a mesh render with the depth information applied to the mesh geometry to achieve the 3DOF plus 6DOF transformation.

In some cases, for frame extrapolation, the time warp process 326 can texture map the second camera frame 312 to a grid of geometric shapes. The time warp process 326 can move the positions of the vertices in the grid based on the motion of the regions of the second camera frame 312 determined during motion estimation. This can shift and manipulate regions of the second camera frame 312 in accordance with their historical motion in order to move objects into their location predicted by the inverse backwards motion estimation previously described.

In some cases, the time warp process 326 can perform camera frame extrapolation by moving a geometry or by moving UV texture coordinates. For example, the time warp process 326 can perform an extrapolation render pass by moving a geometry of a mesh or manipulating UV texture coordinates to change how the second camera frame 312 is mapped to the geometry. In some cases, the time warp process 326 can distort a mesh by moving the geometry of the mesh. In some examples, when moving the geometry, the time warp process 326 can move each vertex during the vertex shader pass based on the motion vector magnitude and direction at a corresponding point. In some examples, when moving texture coordinates, the time warp process 326 can determine the inverse movement and use the inverse to adjust the texture coordinates.

Once the time warp process 326 has completed generating/processing the extrapolated camera frame, the time warp process 326 can generate the new rendered frame 338 by combining the extrapolated camera frame and the virtual content from the eye buffer 336. In some cases, the time warp process 326 can also warp or reproject the new rendered frame 338 as previously described. Once the new rendered frame 338 is complete, the time warp process 326 can provide the new rendered frame 338 to the display 106 for presentation to the user.

Figure 3B:
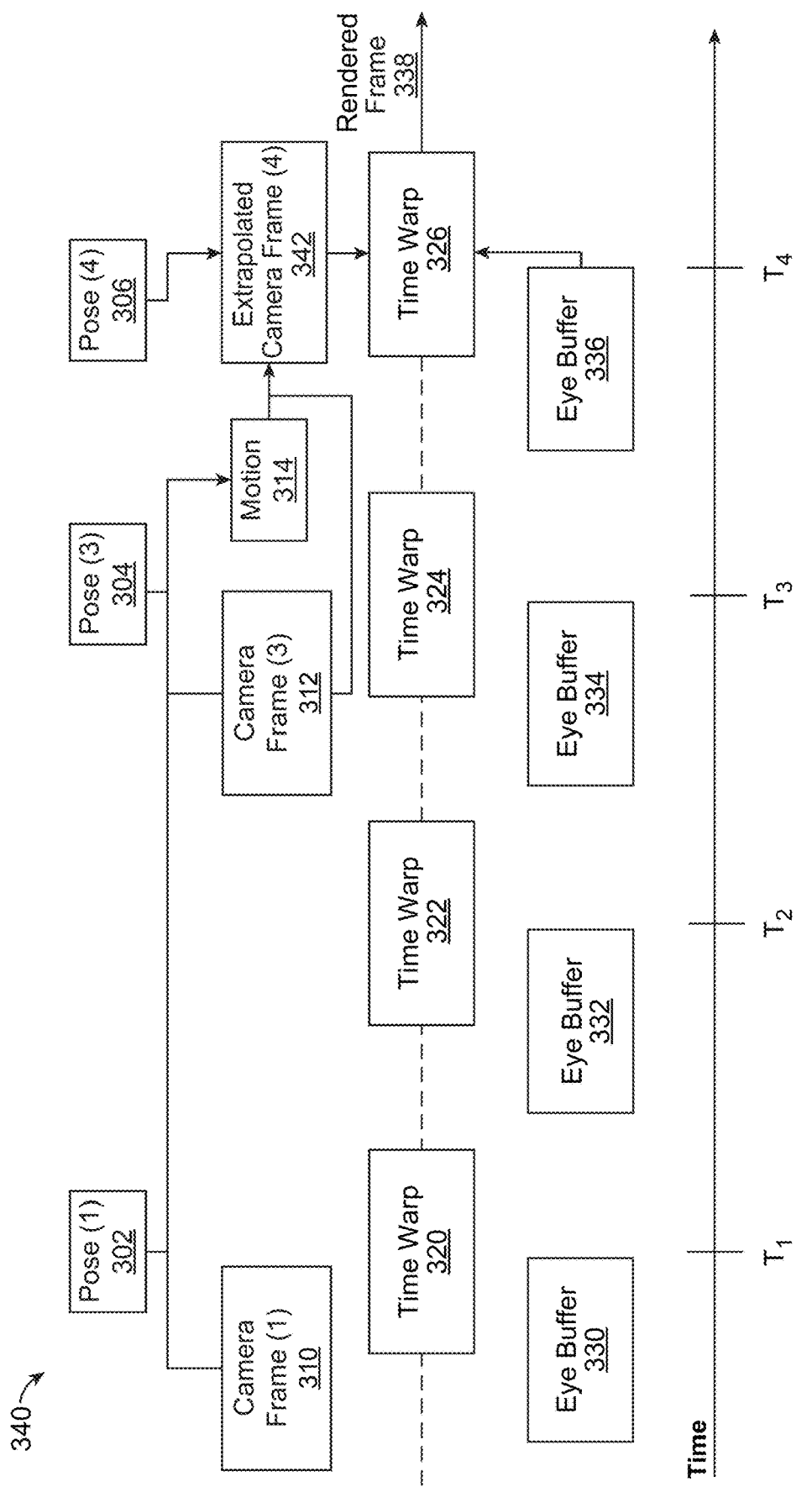
FIG. 3B is a diagram illustrating another example flow for extrapolating a pass-through camera frame to synchronize a frame rate of pass-through camera frames and a display refresh rate, in accordance with some examples of the present disclosure.

FIG. 3B is a diagram illustrating another example flow 340 for extrapolating a pass-through camera frame to synchronize a frame rate of pass-through camera frames and a display refresh rate. In this example, the extrapolated camera frame can be generated by an application on the XR system 100. The application can be separate from a time warp process (e.g., separate from time warp process 320, time warp process 322, time warp process 324, or time warp process 326). In some examples, the application on the XR system 100 can include an XR application, a machine learning model, or any application on the XR system 100.

The flow 340 can combine camera frames obtained from the camera sensor 102 with virtual content rendered by the XR system 100 to provide a mixed reality experience to a user wearing the XR system 100. As previously explained, the camera frames from the camera sensor 102 can capture a scene around the user and can be used as pass-through camera frames to allow the user to see the scene (e.g., through the pass-through camera frames) even if the user is otherwise unable to see the scene while wearing the XR system 100 (e.g., because the XR system 100 blocks the user's eyes and/or visibility of the scene). The XR system 100 can render the virtual content along with the pass-through camera frames to provide the user a mixed reality experience where the user can see virtual content rendered within a depiction of the scene from the pass-through camera frames.

At time $t_1$, the time warp process 320 receives the first camera frame 310 captured by the camera sensor 102 and virtual content from the eye buffer 330, and generates a rendered frame for presentation (e.g., via display 106) to the user of the XR system 100. The rendered frame can be a mixed reality frame generated from the first camera frame 310 captured by the camera sensor 102 and the virtual content from the eye buffer 330. To generate the rendered frame, the time warp process 320 can combine the first camera frame 310 with the virtual content from the eye buffer 330. The first camera frame 310 can depict a scene around the user wearing the XR system 100, and the virtual content can include rendered content generated by the XR system 100 (e.g., via an application of the XR system 100, such as an XR application). Thus, the rendered frame can depict the virtual content from the eye buffer 330 within a view of the scene depicted by the first camera frame 310.

In generating the rendered frame, the time warp process 320 can warp or reproject the rendered frame before sending it to the display 106 for presentation to the user. The time warp process 320 can warp or reproject the rendered frame as previously described with respect to FIG. 3A.

At time $t_2$, the time warp process 322 can obtain virtual content from the eye buffer 332 to generate a new rendered frame for presentation by the display 106 at the next display refresh time of the display 106. Because the display refresh rate of the display 106 is less than the camera frame rate of the camera sensor 102, the time warp process 322 is unable to obtain a new camera frame from the camera sensor 102 at time $t_2$. Thus, the time warp process 322 can generate the new rendered frame based on the camera frame 310 obtained at time $t_1$ and the virtual content from the eye buffer 332. In some examples, when generating the new rendered frame, the time warp process 322 can warp or reproject the new rendered frame to compensate for movement as previously explained.

At time $t_3$, the camera sensor 102 can have a second camera frame 312 ready for presentation by the XR system 100. For example, the camera frame rate of the camera sensor 102 can be such that the camera sensor 102 can generate and provide a new camera frame at every other time interval (e.g., at time $t_1$ followed by time $t_3$), where each time interval is based on or controlled by the display refresh rate of the display 106. Thus, at time $t_3$, the time warp process 324 can obtain the second camera frame 312 from the camera sensor 102 and additional virtual content from the eye buffer 334, to generate a new rendered frame for presentation by the display 106 at the next display refresh time of the display 106.

In generating the new rendered frame, the time warp process 324 can warp or reproject the new rendered frame before sending it to the display 106 for presentation to the user. The time warp process 324 can warp or reproject the new rendered frame as previously explained with respect to FIG. 3A.

At time $t_4$, the time warp process 326 can obtain additional virtual content from the eye buffer 336 to generate a new rendered frame 338 for presentation by the display 106 at the next display refresh time of the display 106. Because the display refresh rate of the display 106 is less than the camera frame rate of the camera sensor 102, the time warp process 326 is unable to obtain a new camera frame from the camera sensor 102 at time $t_4$. To synchronize the display refresh rate with the camera frame rate of the camera sensor 102, an application on the XR system 100 can extrapolate a new camera frame based on an optical flow between the first camera frame 310 and the second camera frame 312. For example, the application on the XR system 100 can calculate motion 314 between the first camera frame 310 and the second camera frame 312, and use the motion 314 to generate an extrapolated camera frame 342. The application on the XR system 100 can provide the extrapolated camera frame 342 to the time warp process 326, which can use the extrapolated camera frame 342 to generate the new rendered frame 338 based on the extrapolated camera frame 342 and the virtual content from the eye buffer 336.

The application on the XR system 100 can determine the motion 314 as previously described with respect to FIG. 3A. In some examples, the application on the XR system 100 can generate the extrapolated camera frame 342 by adjusting the second camera frame 312 based on the optical flow between the first camera frame 310 and the second camera frame 312. In some cases, the application on the XR system 100 can adjust a magnitude of the optical flow used to generate the extrapolated camera frame 342 based on the time intervals between the first camera frame 310 and the second camera frame 312, and the time interval between the second camera frame 312 and the extrapolated camera frame 342, as previously described.

In some examples, the application on the XR system 100 can generate the extrapolated camera frame 342 by using the magnitude of motion estimated to adjust the second camera frame 312. For example, application on the XR system 100 can adjust the second camera frame 312 by projecting the magnitude of motion forward (e.g., to the future) from time $t_3$ associated with the second camera frame 312 to time $t_4$ associated with the extrapolated camera frame.

In some cases, the application on the XR system 100 can calculate a base point of motion vectors to use for the camera frame extrapolation. For example, if the application on the XR system 100 uses standard optical flow to estimate motion vectors for the first camera frame 310 and the second camera frame 312 (e.g., from time $t_1$ to time $t_3$), the motion vectors can indicate that the application on the XR system 100 should apply motion from time $t_1$ to time $t_3$. However, for frame extrapolation, the application on the XR system 100 may instead need to apply motion from time $t_3$ (associated with the second camera frame 312) forward. As previously noted, with standard optical flow, the motion vectors may cause the application on the XR system 100 to move a frame region behind a target depicted in the frames, instead of moving the target depicted in the frames as intended. To avoid such issues, the application on the XR system 100 may calculate the motion vectors backwards and invert the calculated motion vectors to obtain a base point of the motion vectors that projects forward. For example, the application on the XR system 100 can estimate the optical flow from time $t_1$ to time $t_3$, and invert the corresponding motion vector to obtain a motion vector with a base point and projecting motion forward from time $t_3$.

In some cases, the application on the XR system 100 can correct the translational motion between the second camera frame 312 and the extrapolated camera frame 342, and the time warp process 326 can correct the rotational motion between the second camera frame 312 and the extrapolated camera frame 342. In some examples, the application on the XR system 100 can use optical flow to correct the translational motion between the second camera frame 312 and the extrapolated camera frame 342, and the time warp process 326 can perform warping or reprojection to correct the rotational motion. In other cases, the time warp process 326 can correct the translational motion between the second camera frame 312 and the extrapolated camera frame 342, and the rotational motion between the second camera frame 312 and the extrapolated camera frame 342.

In some examples, the application on the XR system 100 can generate the extrapolated camera frame 342 with the translational motion but without the rotational motion. In such examples, the time warp process 326 can correct the rotational motion in the extrapolated camera frame 342. In other examples, the time warp process 326 can warp the extrapolated camera frame to compensate for the translational and rotational motion of the XR system 100, and the application on the XR system 100 can use optical flow to compensate for the translational motion of objects in the scene depicted by the extrapolated camera frame 342.

Once the application on the XR system 100 has completed generating/processing the extrapolated camera frame 342, the time warp process 326 can generate the new rendered frame 338 by combining the extrapolated camera frame 342 and the virtual content from the eye buffer 336. In some cases, the time warp process 326 can also warp or reproject the new rendered frame 338 as previously described. Once the new rendered frame 338 is complete, the time warp process 326 can provide the new rendered frame 338 to the display 106 for presentation to the user.

FIG. 4A is a diagram illustrating an example of motion estimation 400 for extrapolating a camera frame. In this example, the motion is estimated from frame 402 to frame 404. However, the motion estimation 400 shows the motion vectors reflecting the motion from frame 402 to frame 404 being used directly (e.g., without adjustments as further described below with respect to FIG. 4B). Accordingly, the basepoint of the motion vectors will be misaligned with respect to the position of objects depicted in the frame 404 and/or the scene depicted in the frame 404.

For example, if the motion estimation 400 uses standard optical flow to estimate motion vectors for the motion from frame 402 to frame 404, the motion vectors may indicate that the motion for the extrapolated camera frame should be applied from frame 402 to frame 404, which can cause a frame region of the extrapolated camera frame to be moved to behind a target depicted in the frames 402 and 404, instead of moving the target depicted in the frames 402 and 404 forward from frame 404 as intended.

To avoid such issues, the motion vectors associated with frames 402 and 404 can be calculated backwards and inverted to obtain a base point of the motion vectors that projects forward. For example, the optical flow can be calculated from frame 404 to frame 402, and inverted to obtain a motion vector with a base point projecting motion forward from frame 404.

FIG. 4B is a diagram illustrating another example motion estimation 420 for extrapolating a camera frame. In this example, the motion vectors are properly aligned for forward extrapolation from frame 404. Here, the optical flow is calculated from frame 404 to frame 402, and inverted to obtain a motion vector with a base point projecting motion forward from frame 404.

Thus, to produce a motion vector with the proper basepoint and magnitude without needing any additional post-processing steps, the motion vectors can be calculated as the inverse of the motion vectors calculated from the motion from frame 404 to frame 402. As shown in FIG. 4B, the inverse backwards motion vectors are properly aligned for forward extrapolation from frame 404. The extrapolation of the camera frame can then be performed from frame 404 forward based on the inverse backwards motion vectors.

The motion estimation 420 can cover any types of movement such as, for example, 3DOF movement, 6DOF movement, a movement of an object(s) in a scene depicted in the frames 402 and 404, etc. As previously explained, in some cases, a time warp process can cover 3DOF rotational movement. In some examples, before applying motion estimation and frame extrapolation, the input frame can be reprojected such that the 3DOF movement of the XR system 100 is removed. In some cases, the motion estimation and frame extrapolation can be focused on 6DOF movement and object movement in a scene. In some examples, a time warp process can apply 3DOF motion correction after the camera frame has been extrapolated.

In some example cases of 3DOF reprojection, the frames 402 and 404 can be aligned using a matrix transform. In some example cases of 3DOF and 6DOF reprojection, the XR system 100 can use a mesh render with the depth information applied to the mesh geometry of the frame 404 to effect the transformation.

In some examples, extrapolation of a camera frame can be performed using a distorted mesh render. Moreover, the frame 404 can be texture mapped to a regular grid of geometry. The positions of the vertices can be moved based on the motion of the regions of the frame 404 determined during motion estimation. This can shift and manipulate regions of the frame 404 in accordance with their historical motion to move objects into their location predicted by the inverse backwards motion estimation.

Figure 5:
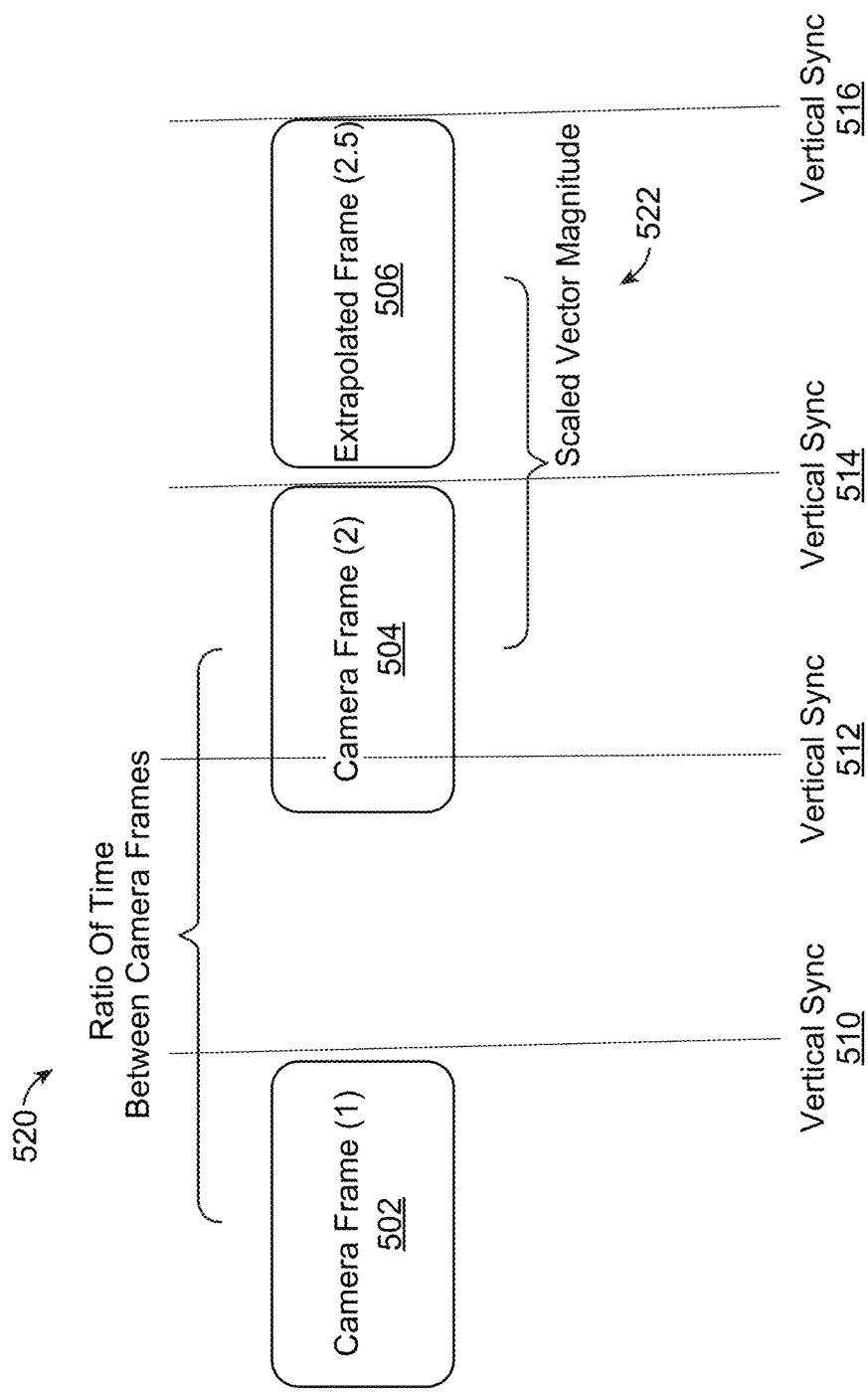
FIG. 5 is a diagram illustrating an example calculation of a motion vector magnitude used to extrapolate a camera frame from a previous frame, in accordance with some examples of the present disclosure.

FIG. 5 is a diagram illustrating an example calculation of a motion vector magnitude used to extrapolate a camera frame from a previous frame. In this example, the vertical sync (Vsync) 510 is shown relative to the camera frame 502, the Vsync 512 and the Vsync 514 are shown relative to the camera frame 504, and the Vsync 516 is shown relative to the extrapolated camera frame 506. Each Vsync (e.g., Vsync 510, Vsync 512, Vsync 514, Vsync 516) depicts a synchronization of a frame rate of virtual content with a display refresh rate.

The frame extrapolation motion vector magnitude can be adjusted based on the ratio of time 520 between the camera frame 502 and the camera frame 504 to determine the scaled vector magnitude 522 used to generate the extrapolated camera frame 506 from the camera frame 504. The scaled vector magnitude 522 can represent the motion vectors and the time between the last camera frame (e.g., camera frame 504) to the extrapolation target frame (e.g., extrapolated camera frame 506).

For example, when predicting the extrapolated camera frame 506, the XR system 100 can determine a magnitude of motion between the camera frames 502 and 504 based on the motion between the camera frame 502 and the camera frame 504 and the ratio of time 520 between the camera frame 502 and the camera frame 504. The magnitude of motion can be used to determine the scaled vector magnitude 522 from the camera frame 504 and the extrapolated camera frame 506. The XR system 100 can use the scaled vector magnitude 522 to predict the extrapolated camera frame 506 based on the camera frame 504.

FIG. 6 is a flowchart illustrating an example process 600 for synchronizing a frame rate of pass-through content from a camera sensor and a display refresh rate of a display. In some cases, the process 600 can be performed by a computing device (or electronic device or apparatus), such as a mobile device (e.g., an XR system such as the XR system 100 of FIG. 1). At block 602, the process 600 can include obtaining a first frame and a second frame captured by an image capture device (e.g., camera sensor 102). The first frame can be a frame captured before the second frame. In some cases, the first frame and the second frame can depict a scene associated with the computing device (e.g., the XR system). A display refresh rate of a display is greater than a camera frame rate of the image capture device. In some cases, the image capture device is part of the computing device, such as the XR system (e.g., XR system 100). In some cases, the display is part of the computing device (e.g., the display 106 of the XR system 100)

In some aspects, the process 600 can include determining that a display refresh rate of the display (e.g., display 106) is greater than the camera frame rate of the image capture device. For example, the computing device (e.g., the XR system 100) can determine the camera frame rate of the image capture device and the display refresh rate of the display, and determine that the display refresh rate is greater than the camera frame rate.

At block 604, the process 600 can include determining motion between the first frame and the second frame. In some cases, the process 600 may include determining the motion between the first frame and the second frame based on the display refresh rate being greater than the camera frame rate. In some examples, determining the motion between the first frame and the second frame can include determining an optical flow between the first frame and the second frame. In some cases, determining the motion between the first frame and the second frame can additionally include determining a first pose of the computing device (e.g., the XR system 100) at a first time when the first frame was captured and a second pose of the computing device (e.g., the XR system 100) at a second time when the second frame was captured. In some examples, the motion between the first frame and the second frame can be based on the optical flow between the first frame and the second frame, the first pose, and the second pose.

At block 606, the process 600 can include predicting, based on the second frame and the motion between the first frame and the second frame, a third frame corresponding to a time after the second frame. For example, the computing device (e.g., the XR system 100) can adjust the second frame to reflect the motion between the first frame and the second frame. In some examples, predicting the third frame can include extrapolating the third frame from the second frame. In some cases, the third frame is extrapolated for a future time corresponding to the time after the second frame.

At block 608, the process 600 can include displaying, at the display, content including the predicted third frame and virtual content rendered for the computing device (e.g., rendered for the XR system 100 by the XR system 100 or by at least one server in a split-rendering architecture, where the server transmits the content to the XR system 100 and the XR system 100 receive the content from the server). The content can depict a scene (e.g., based on the predicted third frame) associated with the computing device (e.g., the XR system 100) combined with the virtual content rendered for the computing device (e.g., the XR system 100). In one illustrative example, the content is mixed reality content.

In some examples, determining the motion between the first frame and the second frame can include determining one or more motion vectors representing motion from the second frame to the first frame, and determining one or more inverse motion vectors representing an inverse of the motion from the second frame to the first frame. In some cases, predicting the third frame can include projecting, based on the one or more inverse motion vectors, a movement of one or more regions of the second frame to the time after the second frame. In some examples, the time after the second frame includes a future time after a different time when the second frame was captured.

In some examples, the motion between the first frame and the second frame can include rotational motion and translational motion. In some aspects, the process 600 can include subtracting the rotational motion from the motion between the first frame and the second frame, predicting the third frame based on the translational motion, and time warping the third frame based on the rotational motion.

In some cases, predicting the third frame can include determining a first amount of time between the first frame and the second frame, determining a second amount of time between the predicting of the third frame and a display time estimated for the third frame, determining a ratio of the first amount of time and the second amount of time, adjusting an amount of the motion between the first frame and the second frame based on the ratio of the first amount of time and the second amount of time, and predicting the third frame based on the adjusted amount of motion between the first frame and the second frame. In some cases, predicting the third frame can include projecting the adjusted amount of motion forward from the second frame to the predicted third frame.

In some aspects, to display the content including the predicted third frame and the virtual content, the process 600 can combine the predicted third frame with the virtual content into a single frame. For instance, in some cases, the process 600 can include combining the virtual content with the predicted third frame, and displaying, at the display, the combined virtual content and predicted third frame. In some examples, the single frame including the combined predicted third frame and virtual content can include the content (e.g., the mixed reality content). In some examples, displaying the content (e.g., the mixed reality content) including the single frame (including the combined predicted third frame and virtual content) can include synchronizing display of the content (e.g., mixed reality content) or the single frame (including the combined predicted third frame and virtual content) with the display refresh rate of the display. In some cases, synchronizing the display of the content (e.g., mixed reality content) or the single frame (including the combined predicted third frame and virtual content) with the display refresh rate of the display can include sending the content (e.g., mixed reality content) or the single frame (including the combined predicted third frame and virtual content) to the display at a particular time associated with the display refresh rate.

In some aspects, determining motion between the first frame and the second frame can include determining translational motion of one or more objects in a scene depicted by the first frame and the second frame, determining translational motion of the computing device (e.g., the XR system 100), and determining rotational motion of the computing device (e.g., the XR system 100). In some aspects, the process 600 can include predicting the third frame based on the translational motion of the one or more objects in the scene depicted by the first frame and the second frame, and time warping the third frame based on the translational motion of the computing device (e.g., the XR system 100) and the rotational motion of the computing device (e.g., the XR system 100).

In some examples, the processes described herein (e.g., process 600, and/or any other process described herein) may be performed by a computing device or apparatus. In one example, the process 600 can be performed by the XR system 100 of FIG. 1. In another example, the process 600 can be performed by the computing system having the computing device architecture of the computing system 700 shown in FIG. 7. For instance, a computing device with the computing device architecture of the computing system 700 shown in FIG. 7 can implement the operations of FIG. 6 and/or the components and/or operations described herein with respect to any of FIGS. 1 through 6.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 600 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other types of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
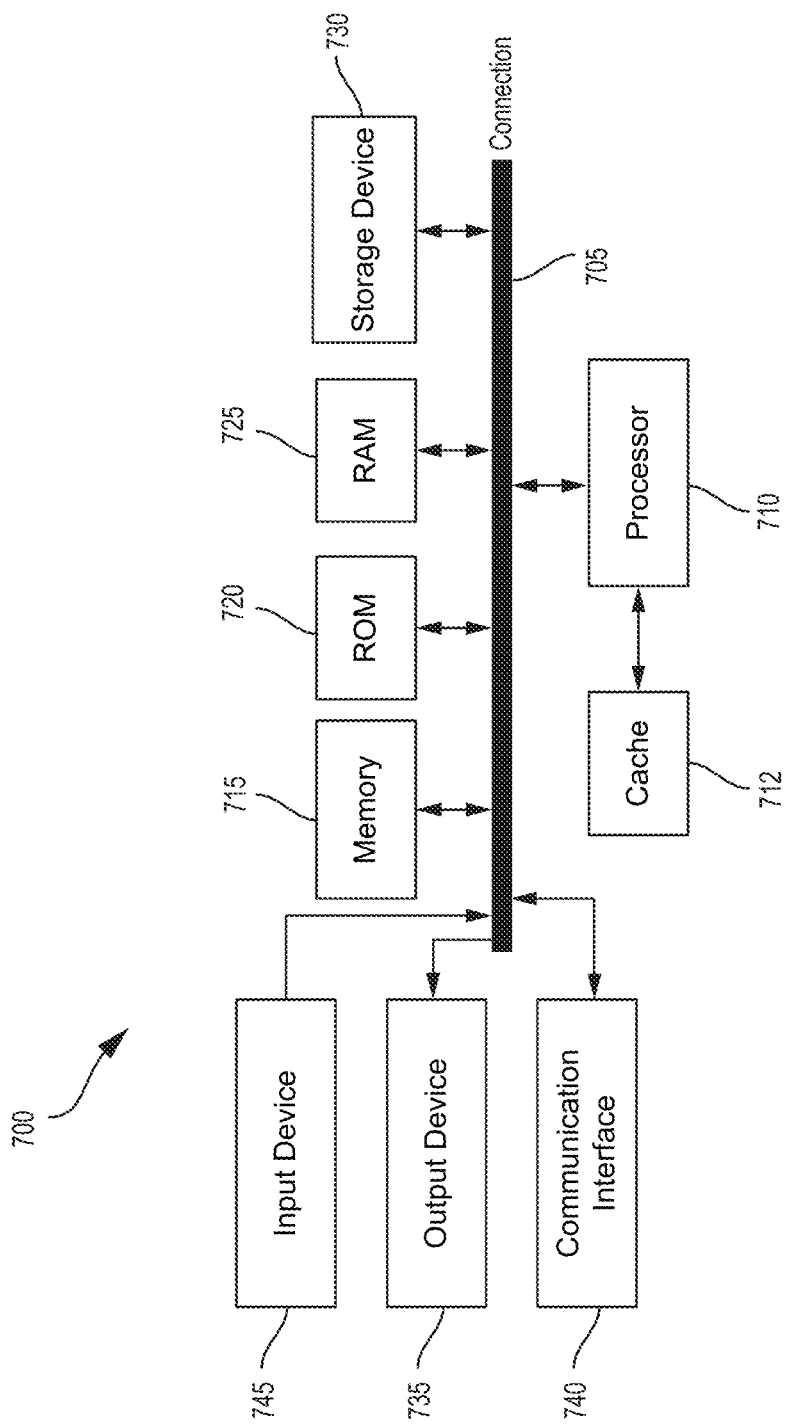
FIG. 7 is a diagram illustrating an example system architecture for implementing certain aspects described herein.

FIG. 7 is a diagram illustrating an example of a system for implementing certain aspects of the present technology. In particular, FIG. 7 illustrates an example of computing system 700, which can be for example any computing device making up internal computing system, a remote computing system, a camera, or any component thereof in which the components of the system are in communication with each other using connection 705. Connection 705 can be a physical connection using a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache 712 of high-speed memory connected directly with, in close proximity to, or integrated as part of processor 710.

Processor 710 can include any general purpose processor and a hardware service or software service stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1. An apparatus for rendering content, the apparatus comprising: a memory; and one or more processors coupled to the memory, the one or more processors being configured to: obtain a first frame and a second frame captured by an image capture device, the first frame being captured before the second frame, wherein a display refresh rate of a display is greater than a camera frame rate of the image capture device; determine motion between the first frame and the second frame; predict, based on the second frame and the motion between the first frame and the second frame, a third frame corresponding to a time after the second frame; and display, at the display, content comprising the predicted third frame and virtual content rendered for the apparatus.

Aspect 2. The apparatus of Aspect 1, wherein, to determine the motion between the first frame and the second frame, the one or more processors are configured to: determine one or more motion vectors representing motion from the second frame to the first frame; and determine one or more inverse motion vectors representing an inverse of the motion from the second frame to the first frame.

Aspect 3. The apparatus of Aspect 2, wherein, to predict the third frame, the one or more processors are configured to: project, based on the one or more inverse motion vectors, a movement of one or more regions of the second frame to the time after the second frame, wherein the time after the second frame comprises a future time after a different time when the second frame was captured.

Aspect 4. The apparatus of any of Aspects 1 to 3, wherein the motion between the first frame and the second frame comprises rotational motion and translational motion.

Aspect 5. The apparatus of Aspect 4, wherein the one or more processors are configured to: subtract the rotational motion from the motion between the first frame and the second frame;

predict the third frame based on the translational motion; and time warp the third frame based on the rotational motion.

Aspect 6. The apparatus of any of Aspects 1 to 5, wherein, to predict the third frame, the one or more processors are configured to: determine a first amount of time between the first frame and the second frame; determine a second amount of time between the predicting of the third frame and a display time estimated for the third frame; determine a ratio of the first amount of time and the second amount of time; adjust an amount of the motion between the first frame and the second frame based on the ratio of the first amount of time and the second amount of time; and predict the third frame based on the adjusted amount of motion between the first frame and the second frame.

Aspect 7. The apparatus of Aspect 6, wherein, to predict the third frame, the one or more processors are configured to project the adjusted amount of motion forward from the second frame to the predicted third frame.

Aspect 8. The apparatus of any of Aspects 1 to 7, wherein, to display the content comprising the predicted third frame and the virtual content, the one or more processors are configured to: combine the predicted third frame with the virtual content into a single frame.

Aspect 9. The apparatus of Aspect 8, wherein the one or more processors are configured to: synchronize display of the content with the display refresh rate of the display.

Aspect 10. The apparatus of Aspect 9, wherein, to synchronize the display of the content with the display refresh rate of the display, the one or more processors are configured to send the content to the display at a particular time associated with the display refresh rate.

Aspect 11. The apparatus of any of Aspects 1 to 10, wherein, to determine motion between the first frame and the second frame, the one or more processors are configured to: determine translational motion of one or more objects in a scene depicted by the first frame and the second frame; determine translational motion of the apparatus; and determine rotational motion of the apparatus.

Aspect 12. The apparatus of Aspect 11, wherein the one or more processors are configured to: predict the third frame based on the translational motion of the one or more objects in the scene depicted by the first frame and the second frame; and time warp the third frame based on the translational motion of the apparatus and the rotational motion of the apparatus.

Aspect 13. The apparatus of any of Aspects 1 to 12, wherein the one or more processors are configured to: determine that the display refresh rate of the display is greater than the camera frame rate of the image capture device.

Aspect 14. The apparatus of any of Aspects 1 to 13, wherein the content includes mixed reality content.

Aspect 15. The apparatus of any of Aspects 1 to 14, wherein the apparatus comprises a mobile device, the mobile device comprising the image capture device and the display.

Aspect 16. The apparatus of any of Aspects 1 to 15, wherein the mobile device comprises an extended reality device.

Aspect 17. The apparatus of any of Aspects 1 to 16, wherein the one or more processors are configured to: render the virtual content.

Aspect 18. The apparatus of any of Aspects 1 to 16, wherein the one or more processors are configured to: receive the virtual content rendered by a server.

Aspect 19. A method for rendering content, the method comprising: obtaining a first frame and a second frame captured by an image capture device of an electronic device, the first frame being captured before the second frame, wherein a display refresh rate of a display is greater than a camera frame rate of the image capture device; determining motion between the first frame and the second frame; predicting, based on the second frame and the motion between the first frame and the second frame, a third frame corresponding to a time after the second frame; and displaying, at the display of the electronic device, content comprising the predicted third frame and virtual content rendered for the electronic device.

Aspect 20. The method of Aspect 19, wherein determining the motion between the first frame and the second frame comprises: determining one or more motion vectors representing motion from the second frame to the first frame; and determining one or more inverse motion vectors representing an inverse of the motion from the second frame to the first frame.

Aspect 21. The method of Aspect 20, wherein predicting the third frame comprises: projecting, based on the one or more inverse motion vectors, a movement of one or more regions of the second frame to the time after the second frame, wherein the time after the second frame comprises a future time after a different time when the second frame was captured.

Aspect 22. The method of any of Aspects 19 to 21, wherein the motion between the first frame and the second frame comprises rotational motion and translational motion.

Aspect 23. The method of Aspect 22, further comprising: subtracting the rotational motion from the motion between the first frame and the second frame; predict the third frame based on the translational motion; and time warping the third frame based on the rotational motion.

Aspect 24. The method of any of Aspects 19 to 23, wherein predicting the third frame comprises: determining a first amount of time between the first frame and the second frame; determine a second amount of time between the predicting of the third frame and a display time estimated for the third frame; determining a ratio of the first amount of time and the second amount of time; adjusting an amount of the motion between the first frame and the second frame based on the ratio of the first amount of time and the second amount of time; and predicting the third frame based on the adjusted amount of motion between the first frame and the second frame.

Aspect 25. The method of Aspect 24, wherein predicting the third frame comprises projecting the adjusted amount of motion forward from the second frame to the predicted third frame.

Aspect 26. The method of any of Aspects 19 to 25, wherein displaying the content comprising the predicted third frame and the virtual content comprises: combining the predicted third frame with the virtual content into a single frame.

Aspect 27. The method of Aspect 26, further comprising: synchronizing display of the content with the display refresh rate of the display.

Aspect 28. The method of Aspect 27, wherein synchronizing the display of the content with the display refresh rate of the display comprises sending the content to the display at a particular time associated with the display refresh rate.

Aspect 29. The method of any of Aspects 19 to 28, wherein determining motion between the first frame and the second frame comprises: determining translational motion of one or more objects in a scene depicted by the first frame and the second frame; determining translational motion of the electronic device; and determining rotational motion of the electronic device.

Aspect 30. The method of Aspect 29, further comprising: predicting the third frame based on the translational motion of the one or more objects in the scene depicted by the first frame and the second frame; and time warping the third frame based on the translational motion of the electronic device and the rotational motion of the electronic device.

Aspect 31. The method of any of Aspects 19 to 30, further comprising: determining that the display refresh rate of the display is greater than the camera frame rate of the image capture device.

Aspect 32. The method of any of Aspects 19 to 31, wherein the content includes mixed reality content.

Aspect 33. The method of any of Aspects 19 to 32, wherein the electronic device comprises a mobile device, the mobile device comprising the image capture device and the display.

Aspect 34. The method of Aspect 33, wherein the mobile device comprises an extended reality device.

Aspect 35. The method of any of Aspects 19 to 34, further comprising: rendering the virtual content.

Aspect 36. The method of any of Aspects 19 to 34, further comprising: receiving the virtual content rendered by a server.

Aspect 37. A non-transitory computer-readable medium having stored thereon instructions which, when executed by one or more processors, cause the one or more processors to perform a method according to any of Aspects 19 to 36.

Aspect 38. An apparatus comprising means for performing a method according to any of Aspects 19 to 36.

What is claimed is:

1. An apparatus for rendering content, the apparatus comprising:
a memory; and
one or more processors coupled to the memory, the one or more processors being configured to:
obtain a first frame and a second frame captured by an image capture device, the first frame being captured before the second frame, wherein a display refresh rate of a display is greater than a camera frame rate of the image capture device;
determine motion between the first frame and the second frame, the motion between the first frame and the second frame comprising rotational motion and translational motion;
subtract the rotational motion from the motion between the first frame and the second frame;
predict, based on the second frame and the translational motion, a third frame corresponding to a time after the second frame;
time warp the predicted third frame based on the rotational motion; and
display, at the display, content comprising the time warped predicted third frame and virtual content rendered for the apparatus.

2. The apparatus of claim 1, wherein, to determine the motion between the first frame and the second frame, the one or more processors are configured to:
determine one or more motion vectors representing motion from the second frame to the first frame; and
determine one or more inverse motion vectors representing an inverse of the motion from the second frame to the first frame.

3. The apparatus of claim 2, wherein, to predict the third frame, the one or more processors are configured to:
project, based on the one or more inverse motion vectors, a movement of one or more regions of the second frame to the time after the second frame, wherein the time after the second frame comprises a future time after a different time when the second frame was captured.

4. The apparatus of claim 1, wherein, to predict the third frame, the one or more processors are configured to:
determine a first amount of time between the first frame and the second frame;
determine a second amount of time between the predicting of the third frame and a display time estimated for the third frame;
determine a ratio of the first amount of time and the second amount of time;
adjust an amount of the motion between the first frame and the second frame based on the ratio of the first amount of time and the second amount of time; and
predict the third frame based on the adjusted amount of motion between the first frame and the second frame.

5. The apparatus of claim 4, wherein, to predict the third frame, the one or more processors are configured to project the adjusted amount of motion forward from the second frame to the predicted third frame.

6. The apparatus of claim 1, wherein, to display the content comprising the predicted third frame and the virtual content, the one or more processors are further configured to:
combine the predicted third frame with the virtual content into a single frame.

7. The apparatus of claim 6, wherein the one or more processors are configured to:
synchronize display of the content with the display refresh rate of the display.

8. The apparatus of claim 7, wherein, to synchronize the display of the content with the display refresh rate of the display, the one or more processors are configured to:
send the content to the display at a particular time associated with the display refresh rate.

9. The apparatus of claim 1, wherein, to determine motion between the first frame and the second frame, the one or more processors are configured to:
determine translational motion of one or more objects in a scene depicted by the first frame and the second frame;
determine translational motion of the apparatus; and
determine rotational motion of the apparatus.

10. The apparatus of claim 9, wherein the one or more processors are configured to:
predict the third frame based on the translational motion of the one or more objects in the scene depicted by the first frame and the second frame; and
time warp the predicted third frame based on the translational motion of the apparatus and the rotational motion of the apparatus.

11. The apparatus of claim 1, wherein the one or more processors are configured to:
determine that the display refresh rate of the display is greater than the camera frame rate of the image capture device.

12. The apparatus of claim 1, wherein the content includes mixed reality content.

13. The apparatus of claim 1, wherein the apparatus comprises a mobile device, the mobile device comprising the image capture device and the display.

14. The apparatus of claim 13, wherein the mobile device comprises an extended reality device.

15. The apparatus of claim 1, wherein the one or more processors are configured to:
render the virtual content.

16. The apparatus of claim 1, wherein the one or more processors are configured to:
receive the virtual content rendered by a server.

17. A method for rendering content, the method comprising:
obtaining a first frame and a second frame captured by an image capture device of an electronic device, the first frame being captured before the second frame, wherein a display refresh rate of a display is greater than a camera frame rate of the image capture device;
determining motion between the first frame and the second frame, the motion between the first frame and the second frame comprising rotational motion and translational motion;
subtracting the rotational motion from the motion between the first frame and the second frame;
predicting, based on the second frame and the translational motion, a third frame corresponding to a time after the second frame;
time warp the predicted third frame based on the rotational motion; and displaying, at the display of the electronic device, content comprising the time warped predicted third frame and virtual content rendered for the electronic device.

18. The method of claim 17, wherein determining the motion between the first frame and the second frame comprises:
determining one or more motion vectors representing motion from the second frame to the first frame; and
determining one or more inverse motion vectors representing an inverse of the motion from the second frame to the first frame.

19. The method of claim 18, wherein predicting the third frame comprises:
projecting, based on the one or more inverse motion vectors, a movement of one or more regions of the second frame to the time after the second frame, wherein the time after the second frame comprises a future time after a different time when the second frame was captured.

20. The method of claim 17, wherein predicting the third frame comprises:
determining a first amount of time between the first frame and the second frame;
determining a second amount of time between the predicting of the third frame and a display time estimated for the third frame;
determining a ratio of the first amount of time and the second amount of time;
adjusting an amount of the motion between the first frame and the second frame based on the ratio of the first amount of time and the second amount of time; and
predicting the third frame based on the adjusted amount of motion between the first frame and the second frame.

21. The method of claim 20, wherein predicting the third frame comprises projecting the adjusted amount of motion forward from the second frame to the predicted third frame.

22. The method of claim 21, wherein displaying the content comprising the predicted third frame and the virtual content comprises combining the predicted third frame with the virtual content into a single frame.

23. The method of claim 22, further comprising:
synchronizing display of the content with the display refresh rate of the display.

24. The method of claim 23, wherein synchronizing the display of the content with the display refresh rate of the display comprises sending the content to the display at a particular time associated with the display refresh rate.

25. The method of claim 17, wherein determining motion between the first frame and the second frame comprises:
determining translational motion of one or more objects in a scene depicted by the first frame and the second frame;
determining translational motion of the electronic device; and
determining rotational motion of the electronic device.

26. The method of claim 25, further comprising:
predicting the third frame based on the translational motion of the one or more objects in the scene depicted by the first frame and the second frame; and
time warping the predicted third frame based on the translational motion of the electronic device and the rotational motion of the electronic device.

27. The method of claim 17, further comprising:
determining that the display refresh rate of the display is greater than the camera frame rate of the image capture device.

28. The method of claim 17, further comprising:
rendering the virtual content.

29. The method of claim 17, further comprising:
receiving the virtual content rendered by a server.

* * * * *